(12) United States Patent
Takashima

(10) Patent No.: US 9,774,108 B2
(45) Date of Patent: Sep. 26, 2017

(54) ELECTRICAL CONNECTION DEVICE, TERMINAL BLOCK INCLUDING SAME, PHOTOVOLTAIC POWER GENERATION SYSTEM, AND ELECTRICAL APPLIANCE

(71) Applicant: KITANI ELECTRIC COMPANY LIMITED, Osaka (JP)

(72) Inventor: Yuichi Takashima, Osaka (JP)

(73) Assignee: KITANI ELECTRIC COMPANY LIMITED, Osaka (JP)

( * ) Notice: Subject to any disclaimer, the term of this patent is extended or adjusted under 35 U.S.C. 154(b) by 0 days.

(21) Appl. No.: 15/323,919

(22) PCT Filed: Jun. 25, 2015

(86) PCT No.: PCT/JP2015/068301
§ 371 (c)(1),
(2) Date: Jan. 4, 2017

(87) PCT Pub. No.: WO2016/009804
PCT Pub. Date: Jan. 21, 2016

(65) Prior Publication Data
US 2017/0141492 A1    May 18, 2017

(30) Foreign Application Priority Data
Jul. 16, 2014 (JP) ................ 2014-146106

(51) Int. Cl.
*H01R 9/24* (2006.01)
*H02S 40/34* (2014.01)

(52) U.S. Cl.
CPC ........... *H01R 9/2416* (2013.01); *H02S 40/34* (2014.12)

(58) Field of Classification Search
CPC ....... H01R 9/2416; H01R 9/24; H01R 9/2408
See application file for complete search history.

(56) References Cited

FOREIGN PATENT DOCUMENTS

JP    H09-161868 A    6/1997
JP    2003-068380 A   3/2003
(Continued)

OTHER PUBLICATIONS

International Search Report for PCT/JP2015/068301, Aug. 11, 2015.
(Continued)

*Primary Examiner* — Ross Gushi

(57) ABSTRACT

There is provided an electrical connection device (100) including a male portion including a head (21) having a groove for insertion of a driver, and a body portion (24) having a spirally penetrating first guide hole (26a) formed from a lower end and a second guide hole (26b); a female portion (116) having a hole portion (118) into which the body portion (24) is inserted; an elastic portion (40) to be disposed on an outer circumference of the body portion (24) when the body portion (24) is inserted into the hole portion (118); and a movable body (30) which is disposed below the elastic portion, and engages and penetrates through the first guide hole (26a) when the body portion (24) is inserted into the hole portion (11), in which a first conductive member (50) and a second conductive member (60) are interposed between an upper end of the elastic portion (40) and the head (21), and with the movable body (30) engaged in the first guide hole (26a), as the head (21) rotates to a predetermined rotation angle relative to the hole portion (118), a biasing force of the elastic portion (40) is increased due to a rise of the movable body (30) in contact with a lower end of the elastic portion (40), and when a rotation angle of the head (21) relative to the hole portion (118) exceeds the predetermined rotation angle, the movable body (30) engages in an end portion (29) of a second guide hole (26b) leading to the first guide hole (26a), the second guide hole being provided in a direction in which the biasing force is reduced, to (Continued)

suppress rotational movement of the movable body (30) relative to the body portion (24).

14 Claims, 24 Drawing Sheets

(56) References Cited

FOREIGN PATENT DOCUMENTS

| | | |
|---|---|---|
| JP | 2005-149757 A | 6/2005 |
| JP | 2011-181710 A | 9/2011 |
| JP | 2014-22066 A | 2/2014 |

OTHER PUBLICATIONS

Written Opinion of the International Search Authority for PCT/JP2015/068301, Aug. 11, 2015.

[Fig. 1]
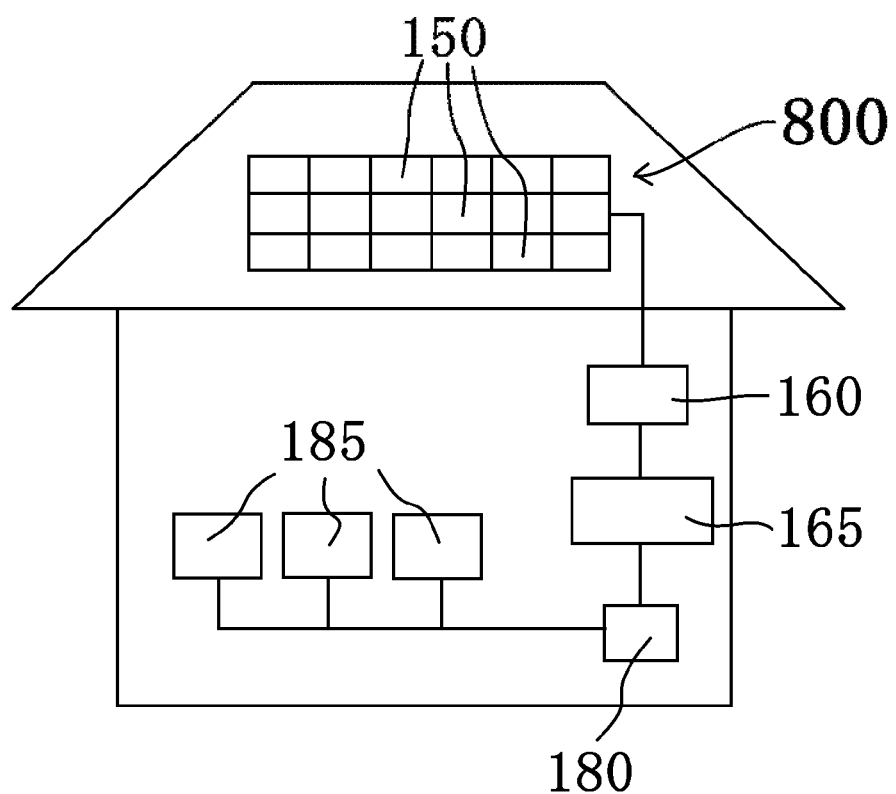

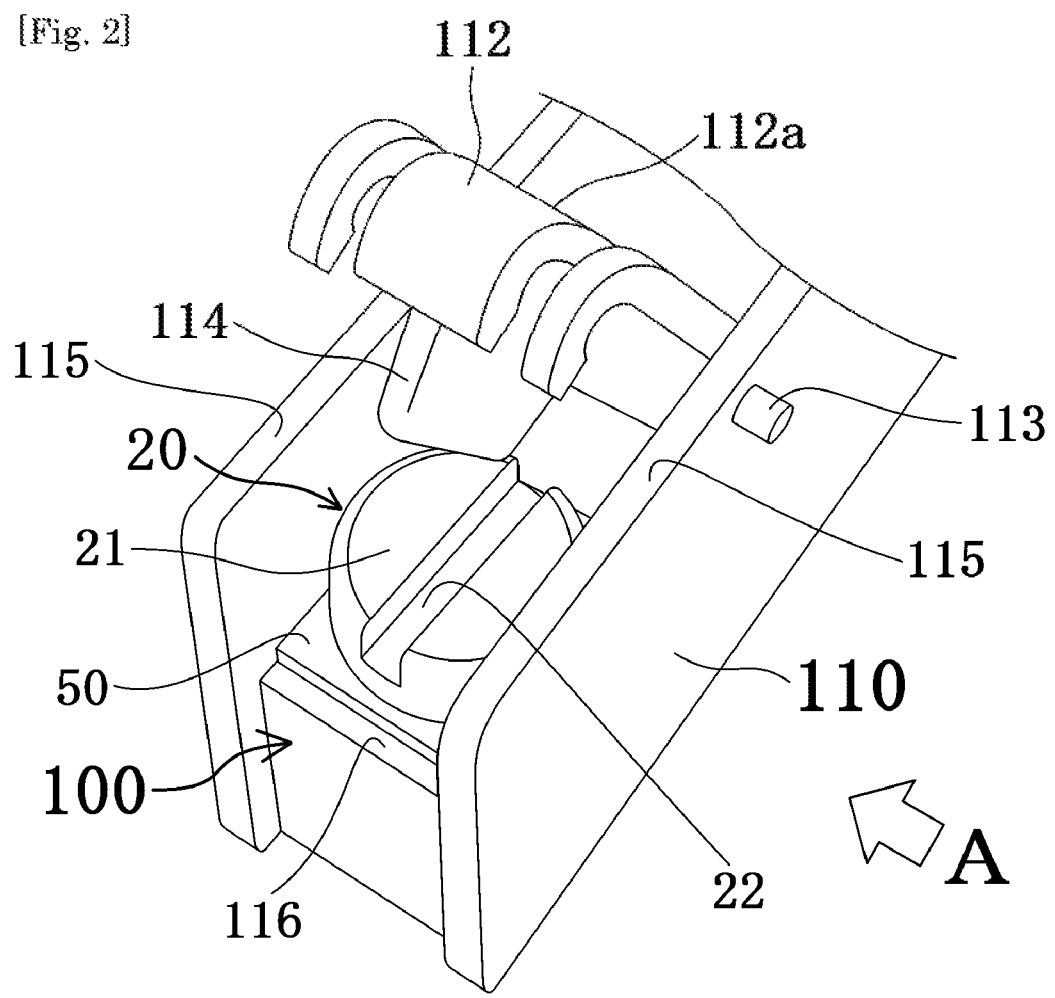
[Fig. 2]

[Fig. 3]
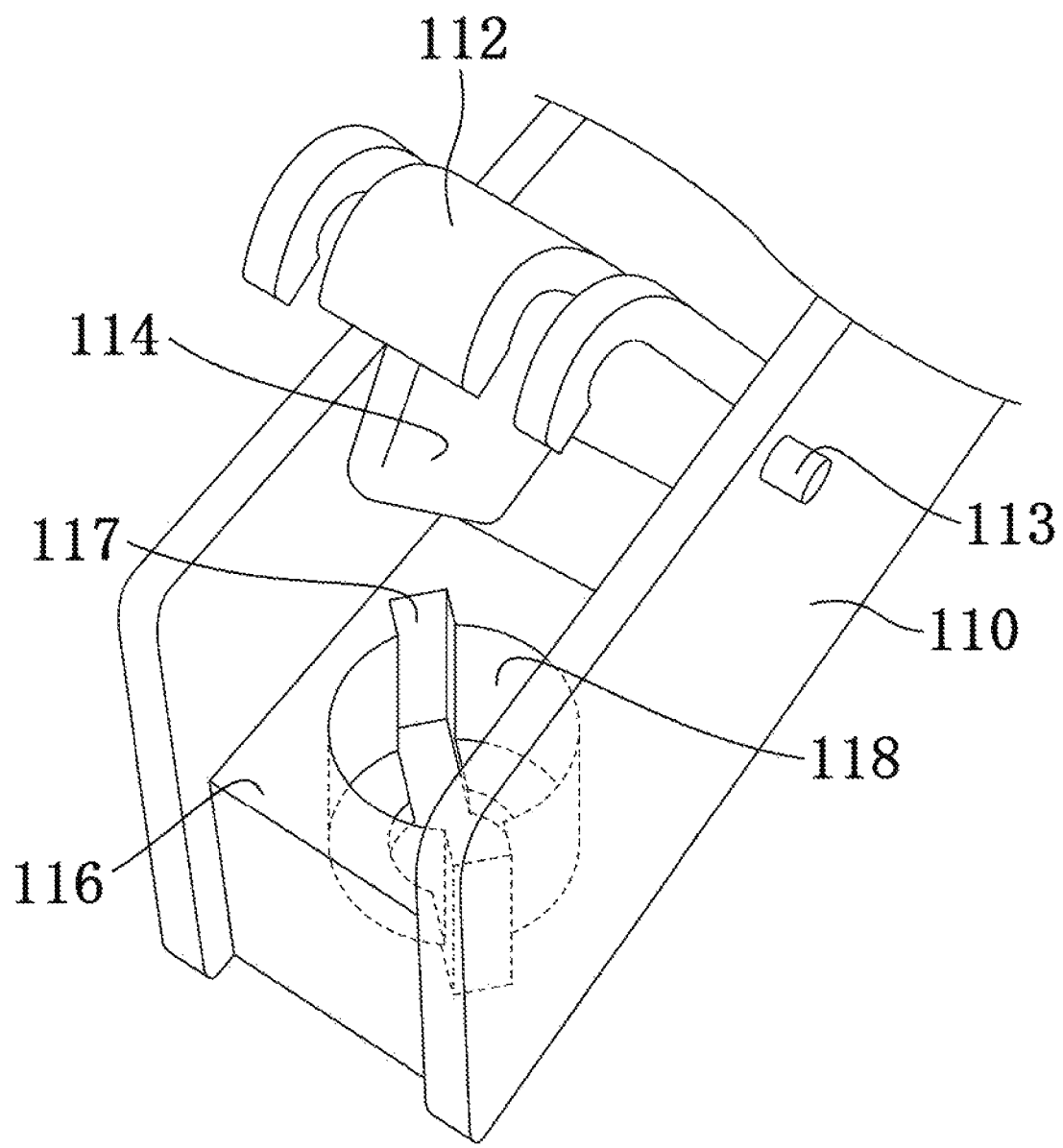

[Fig. 4A]
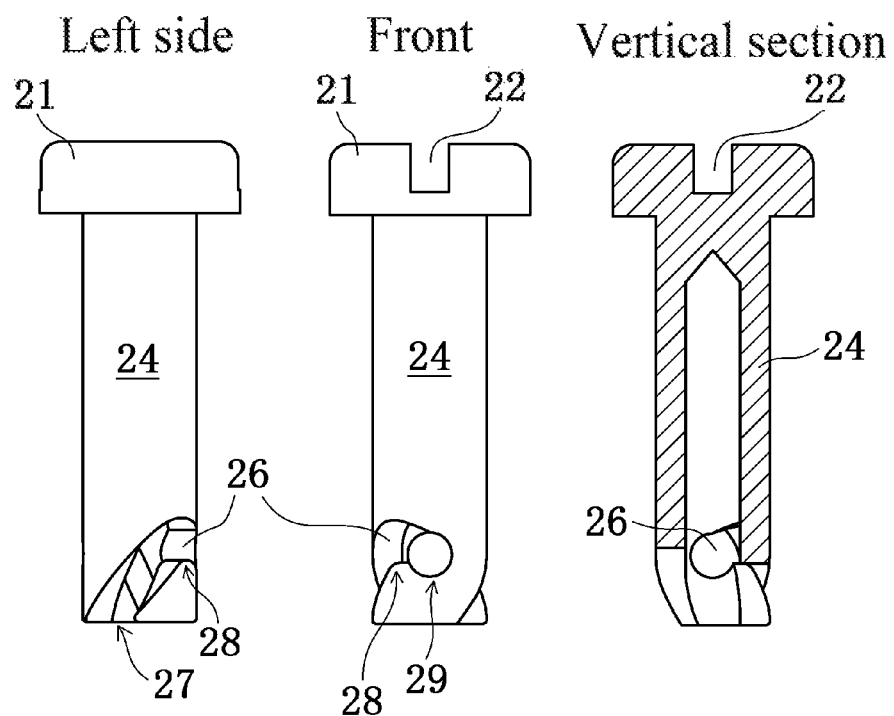

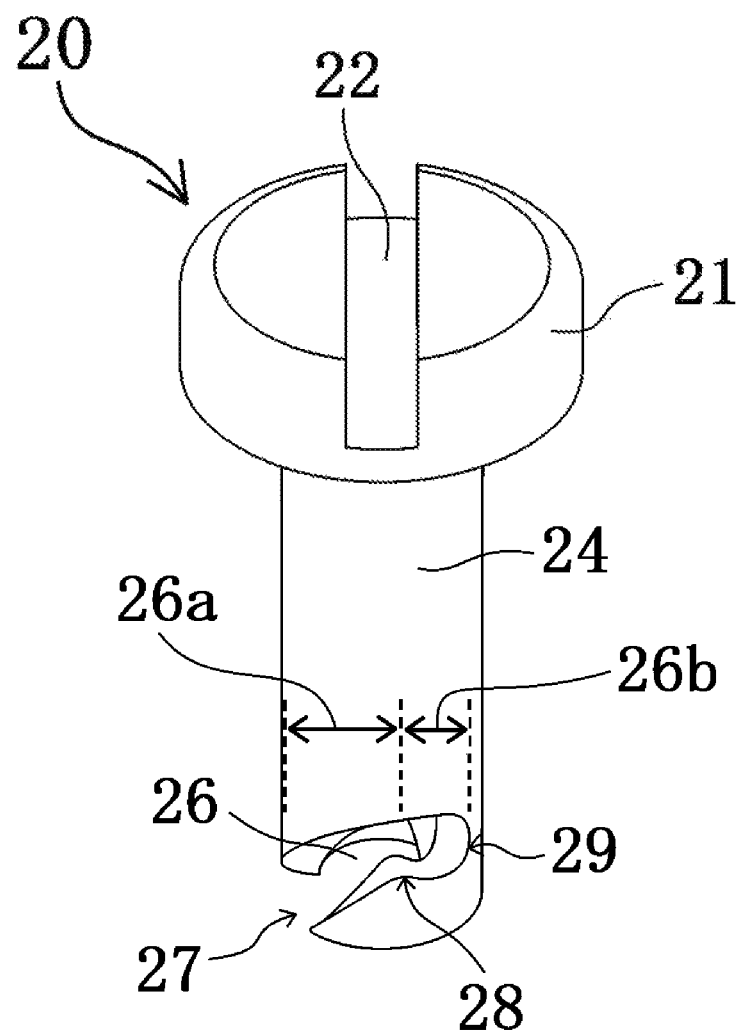
[Fig. 4B]

[Fig. 5]
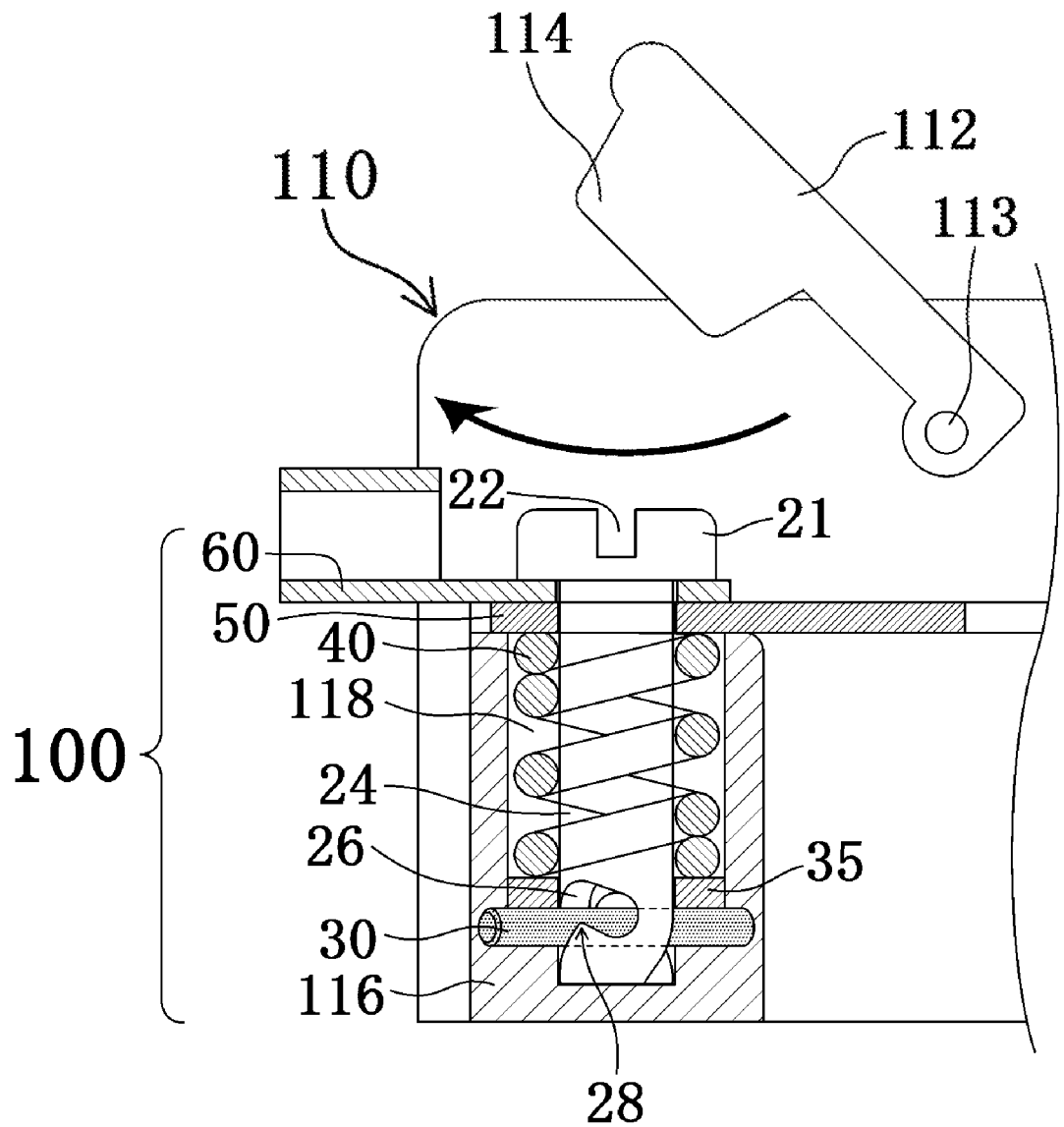

[Fig. 6]
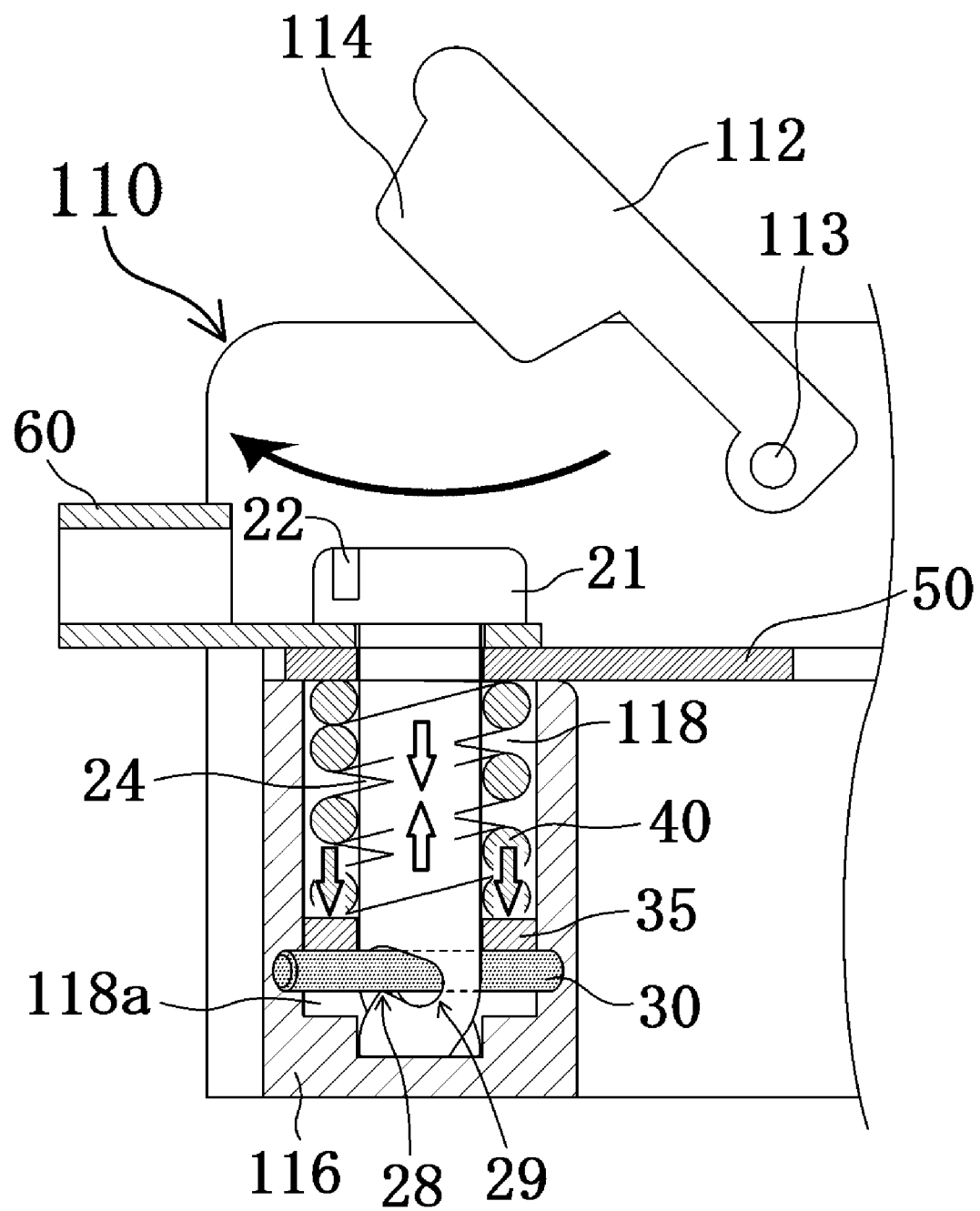

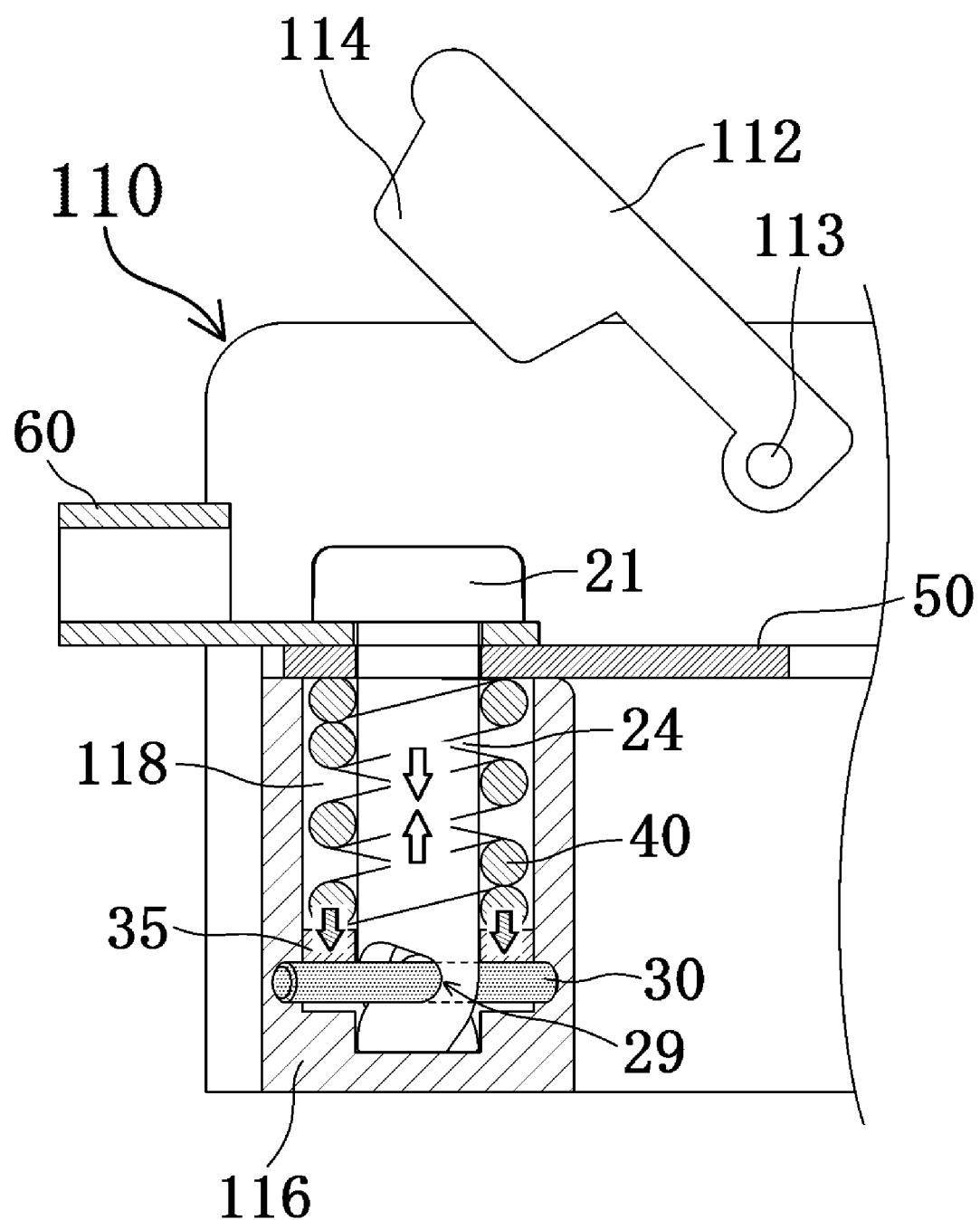
[Fig. 7]

[Fig. 8]
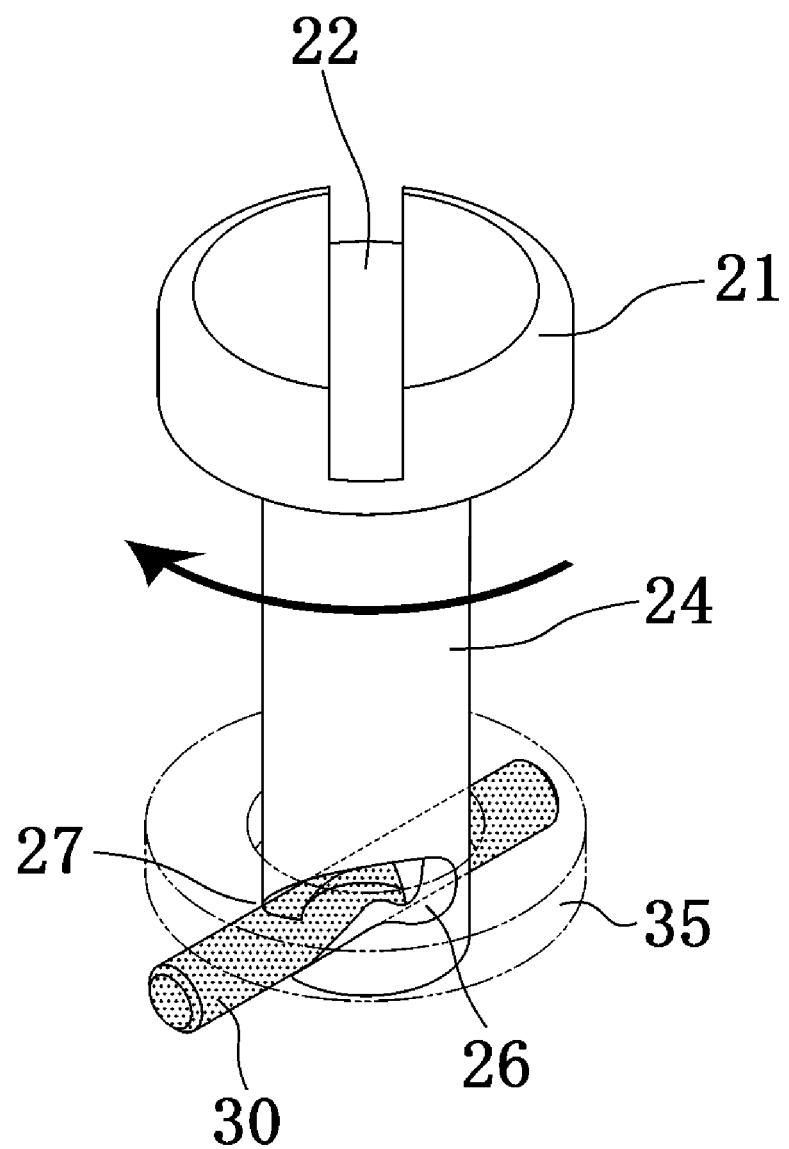

[Fig. 9]
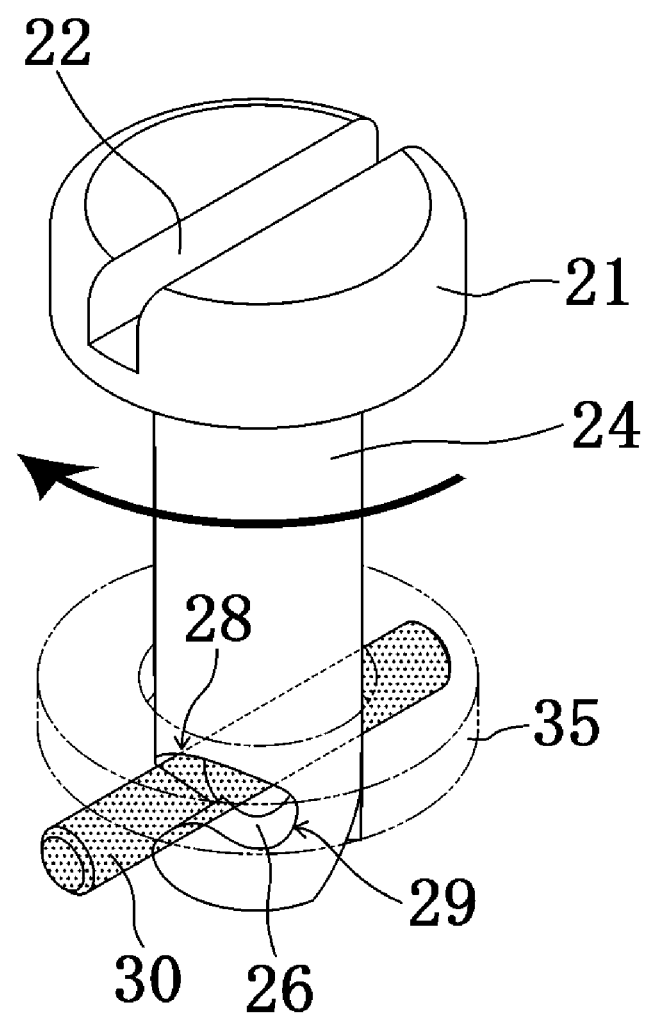

[Fig. 10]
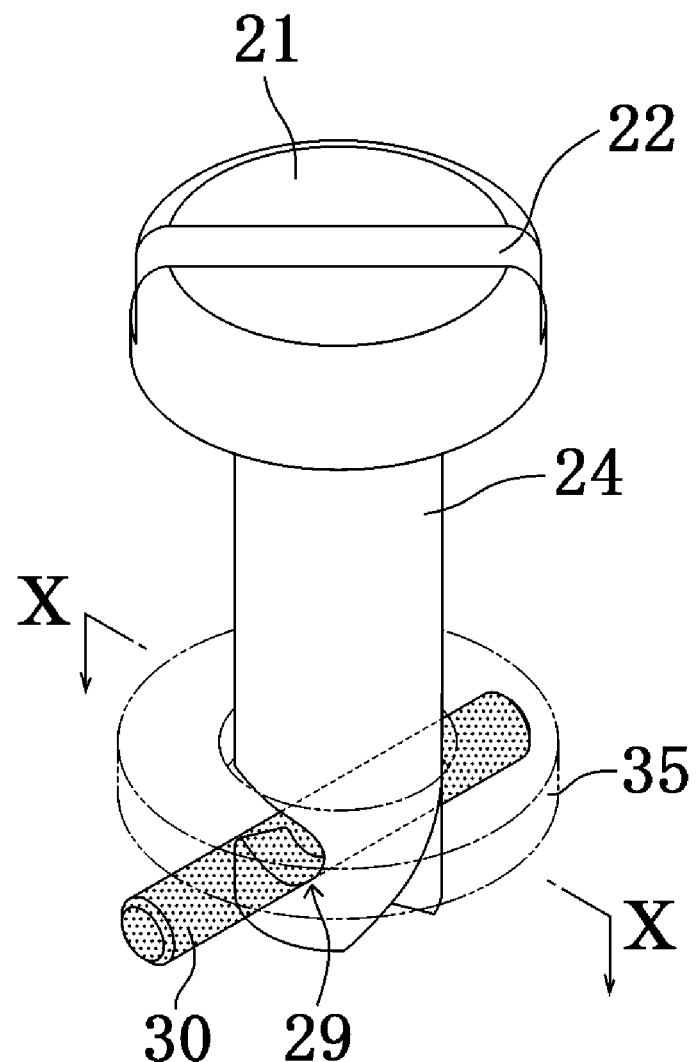

[Fig. 11]
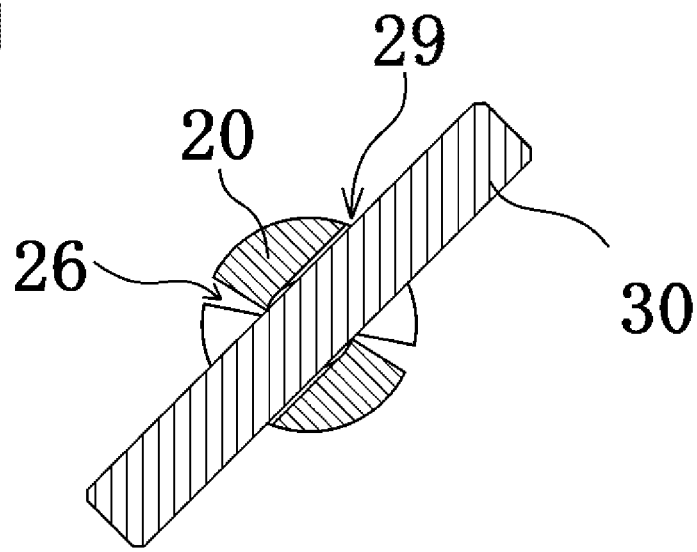
[Fig. 12A]
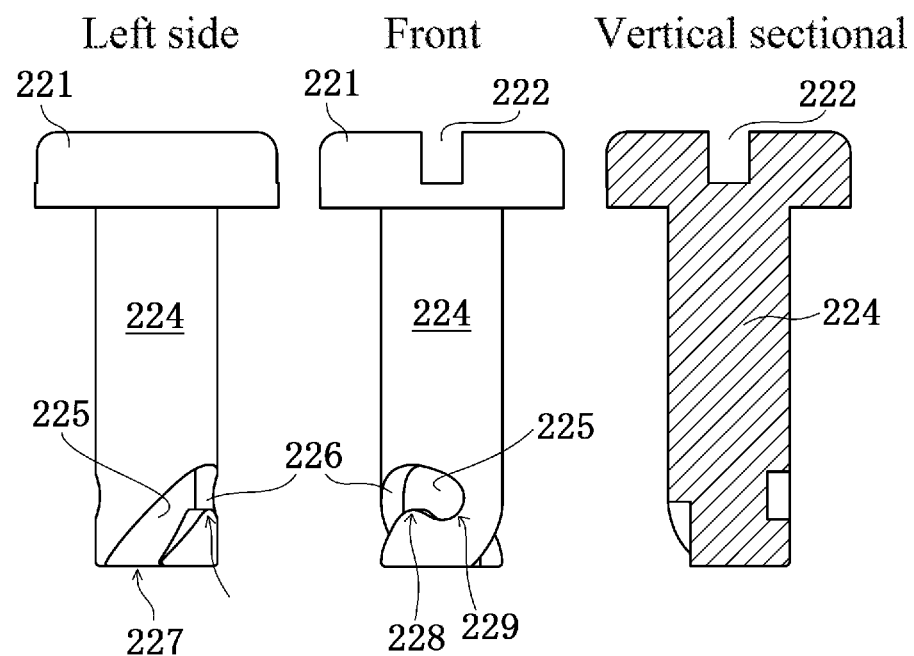

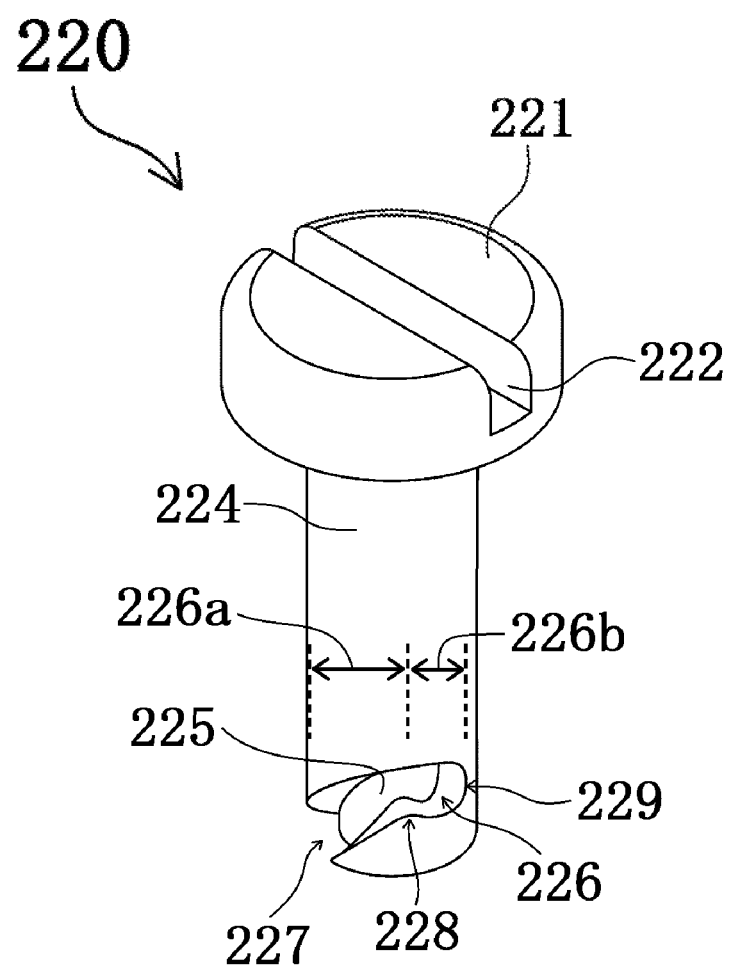
[Fig. 12B]

[Fig. 13]
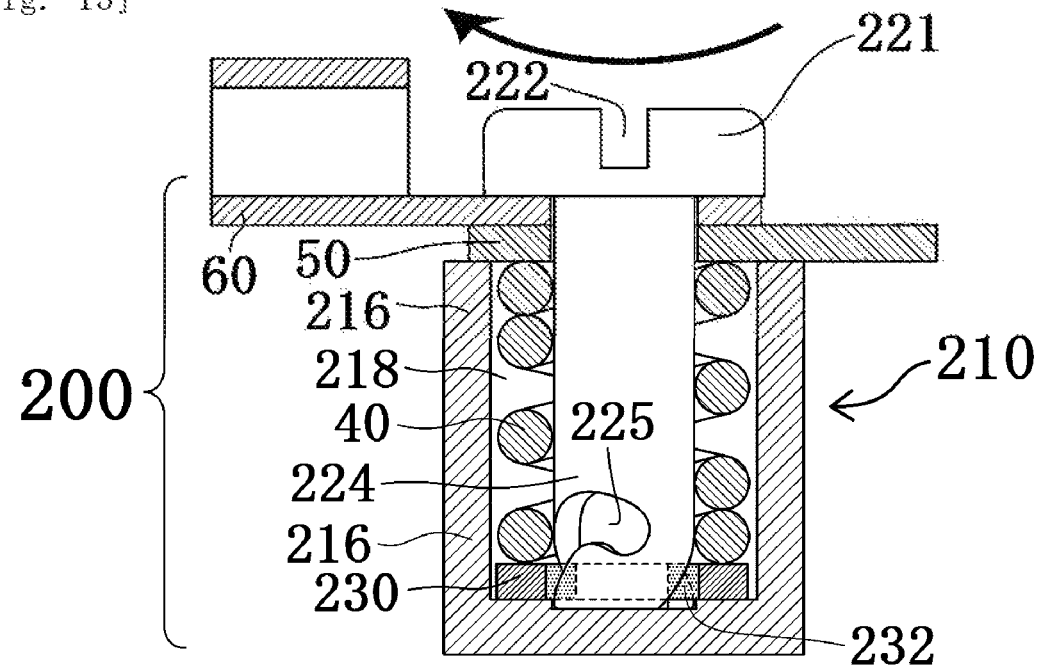
[Fig. 14]
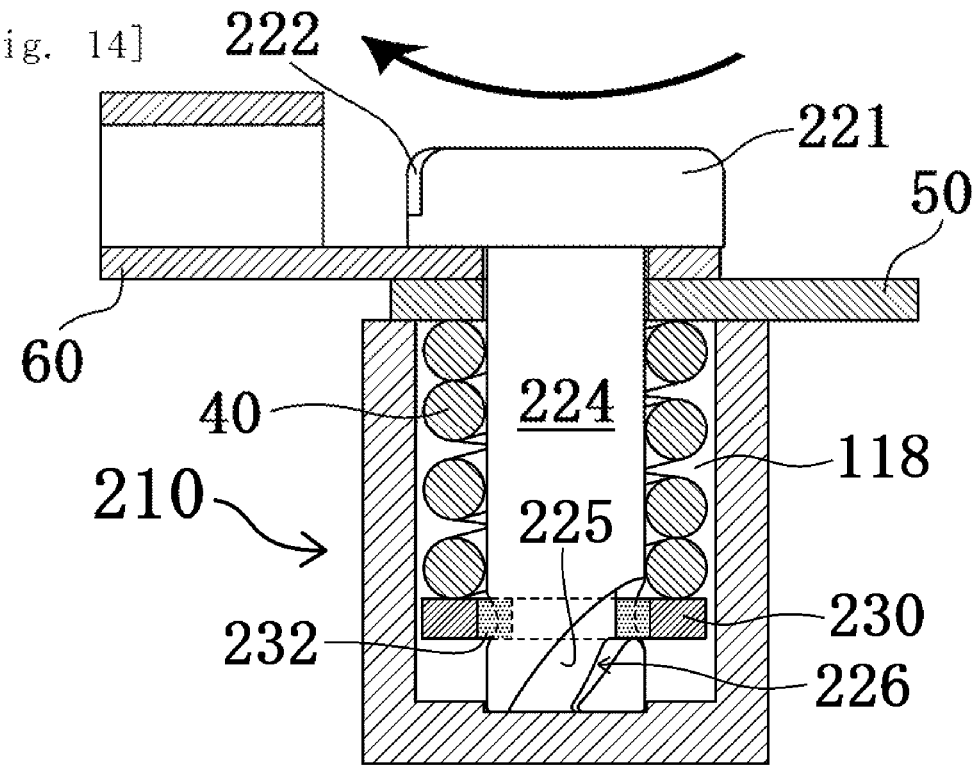

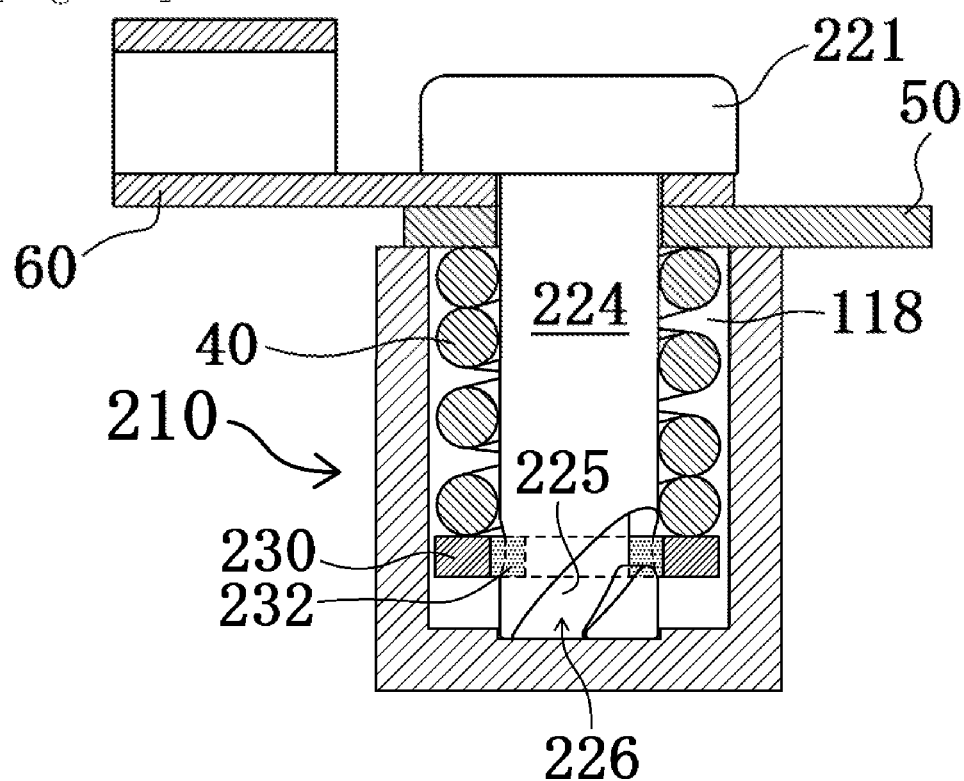
[Fig. 15]

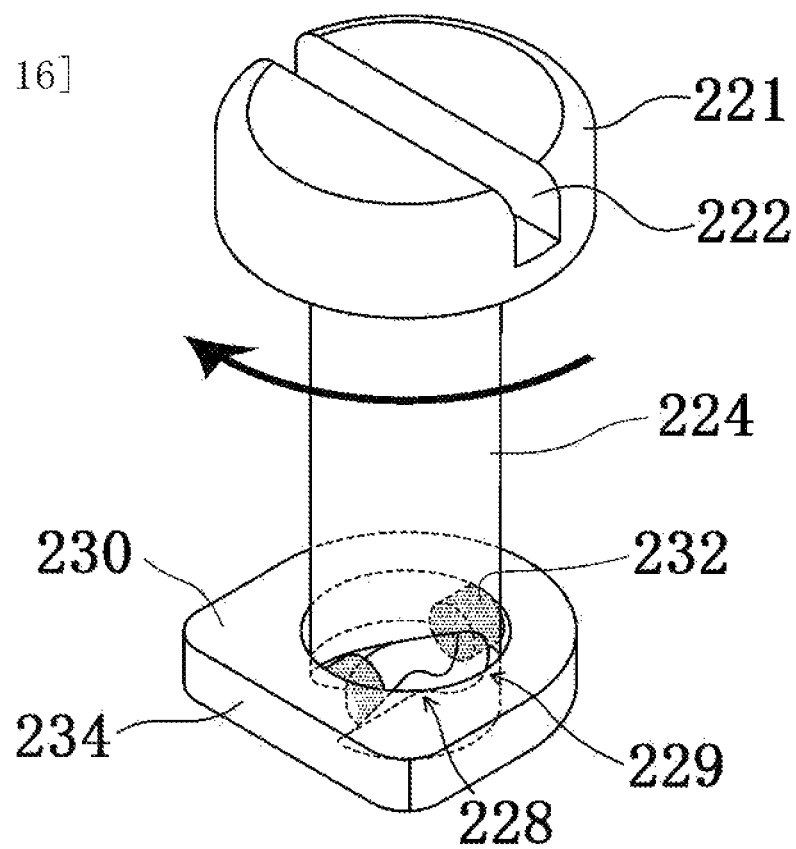
[Fig. 16]

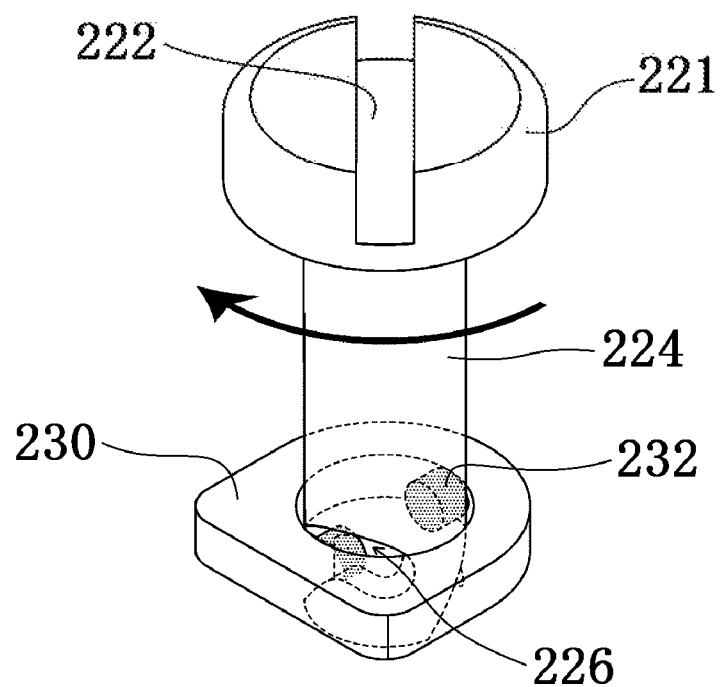
[Fig. 17]

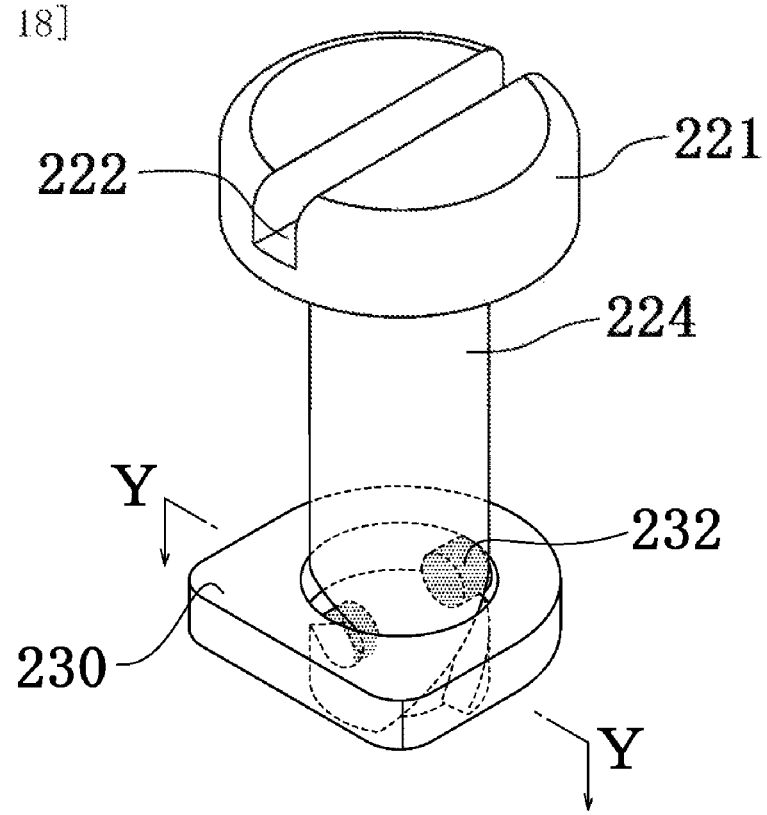
[Fig. 18]

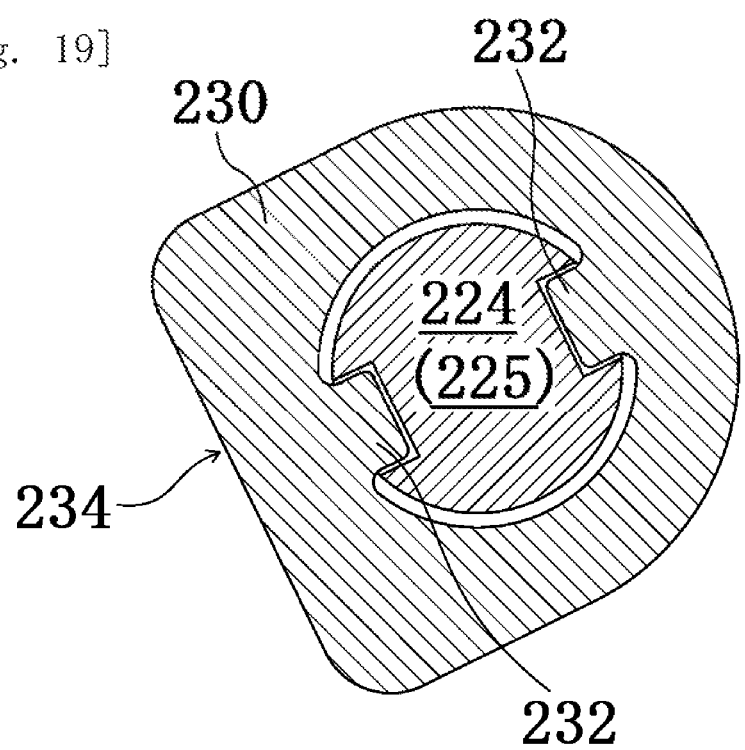

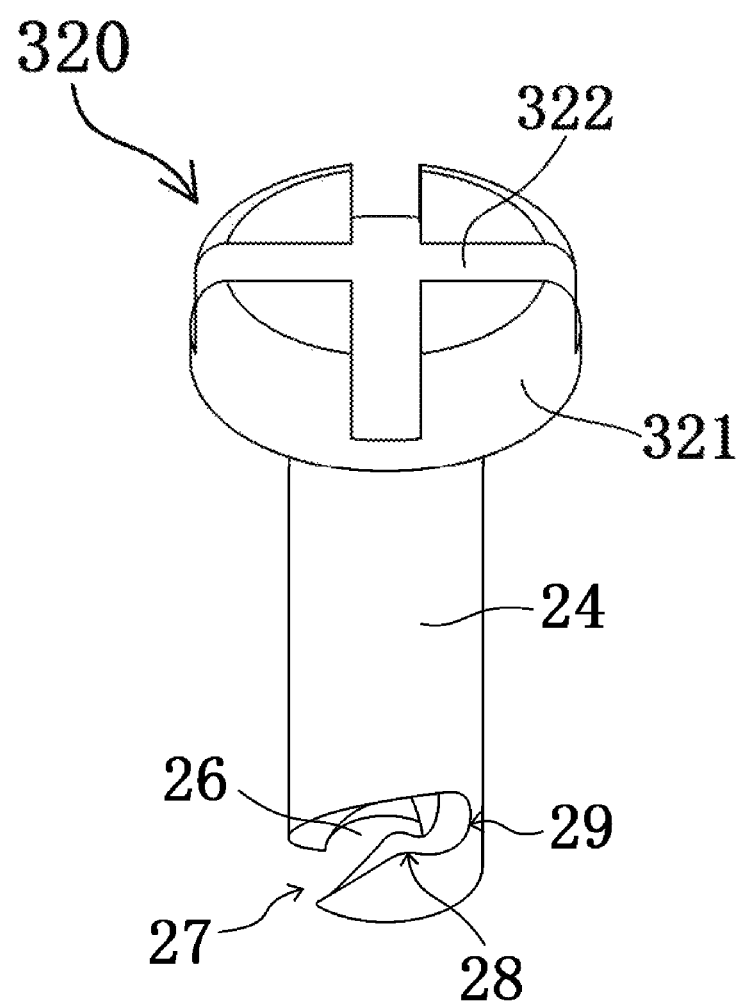
[Fig. 20]

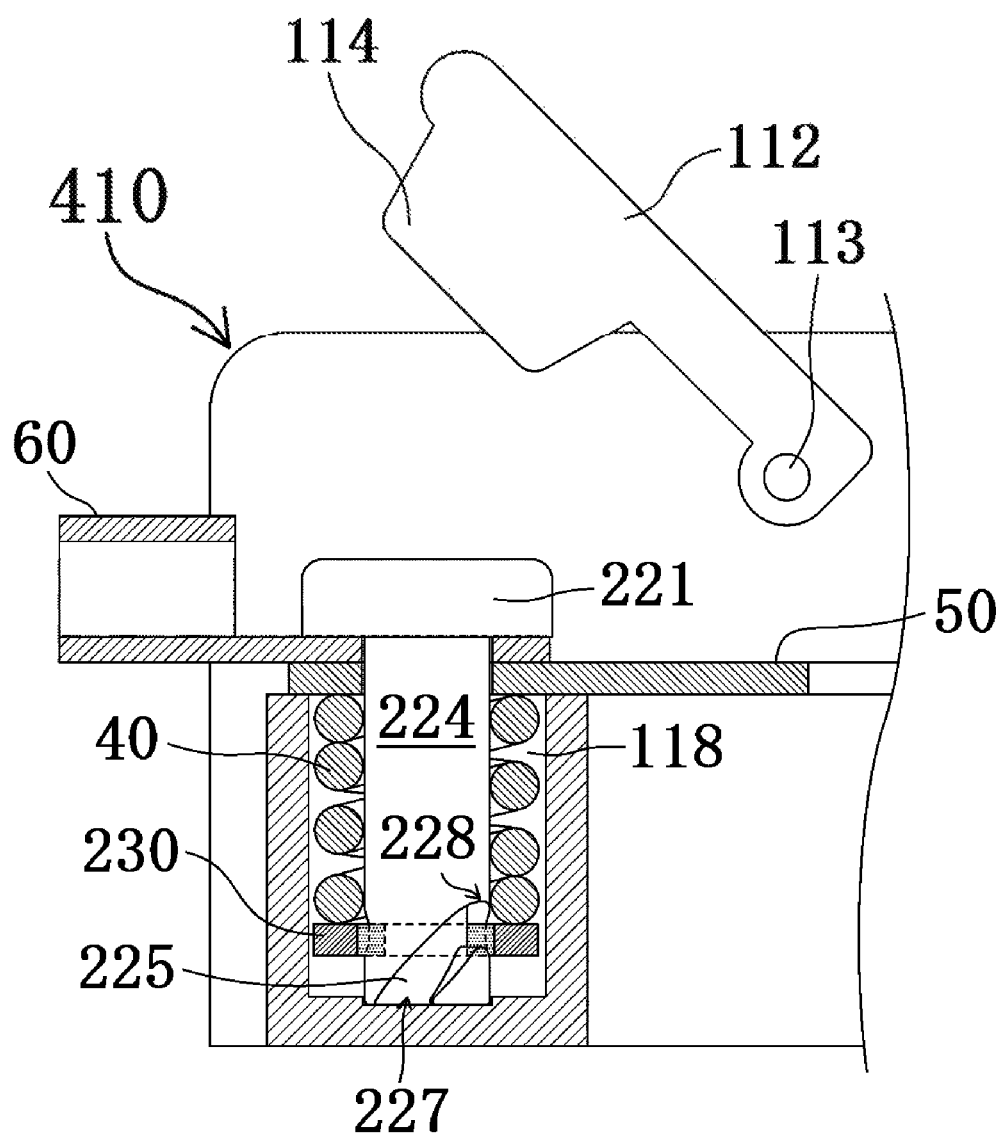
[Fig. 21]

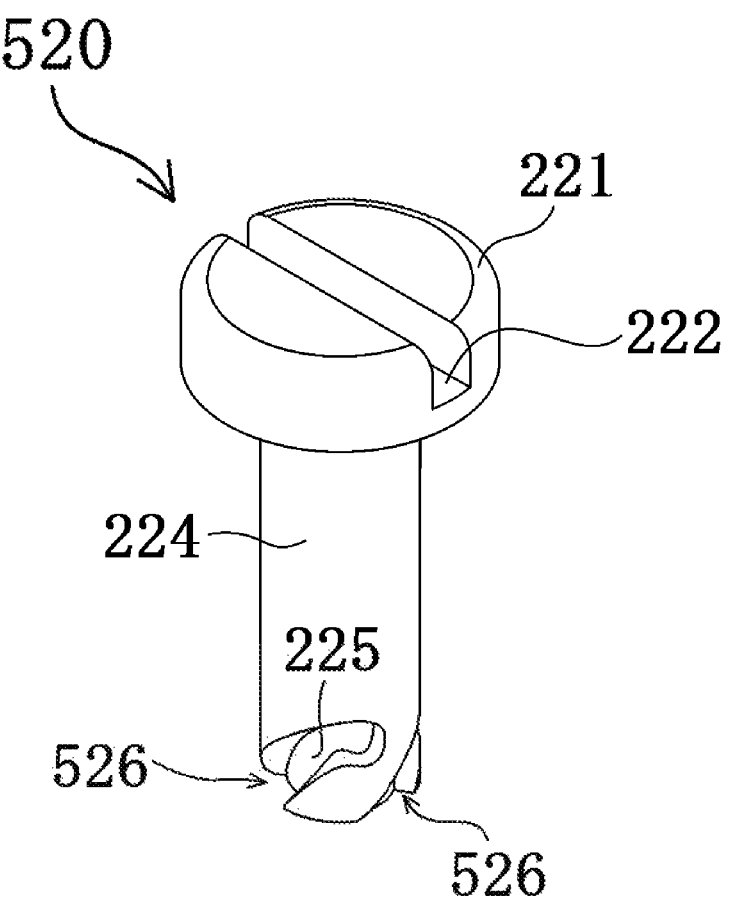
[Fig. 22]

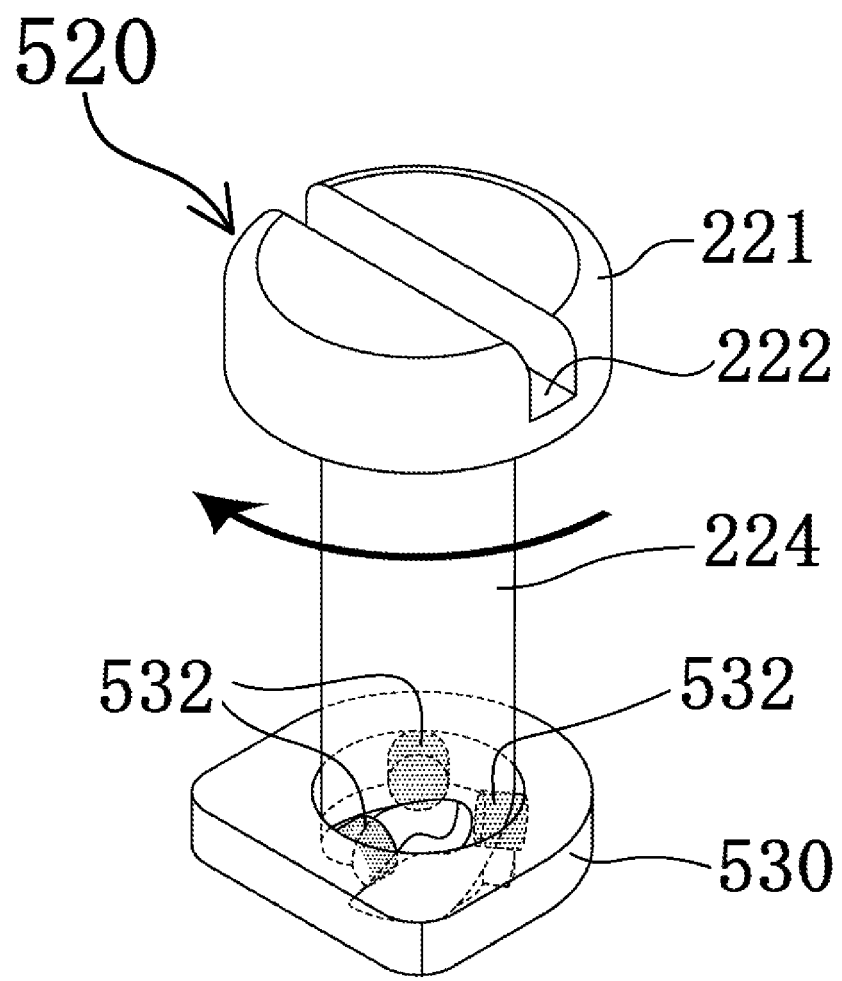
[Fig. 23]

[Fig. 24]
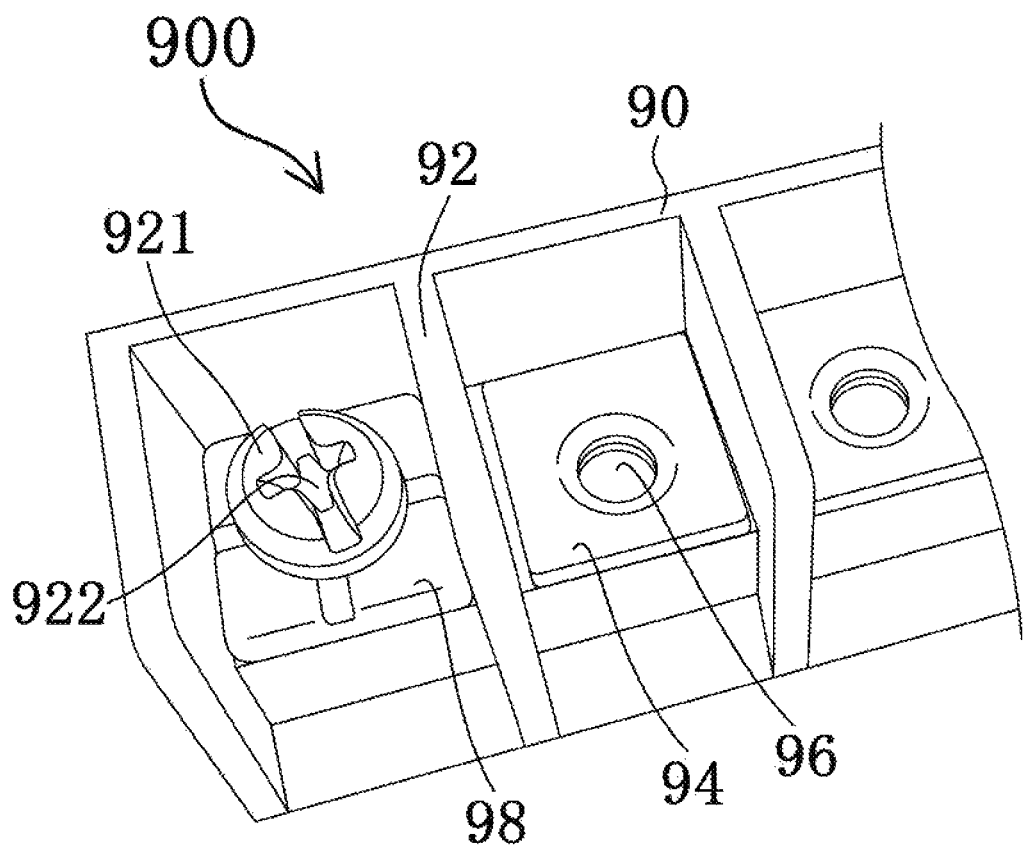

ELECTRICAL CONNECTION DEVICE, TERMINAL BLOCK INCLUDING SAME, PHOTOVOLTAIC POWER GENERATION SYSTEM, AND ELECTRICAL APPLIANCE

TECHNICAL FIELD

The present invention relates to an electrical connection device and a terminal block including the same, a photovoltaic power generation system, and an electrical appliance.

BACKGROUND ART

For example, in wiring connection inside various electrical appliances or in connection between various electrical appliances, as shown in FIG. 24, electrical connection work is conducted using a terminal block 900, which is divided into a plurality of sections by walls 90, 92, to fasten a lead line and a conductive plate 94 by a bolt 922 with a washer 98 provided therebetween.

On this occasion, a worker required to conduct bolt fastening work for numerous terminals or a worker required to conduct such work for a long period of time often needs more time for confirming that each bolt is securely fastened or not. Additionally, from a point of view of workability, a worker may insert a driver into a groove 922 of a bolt 921 and conduct so-called temporary fixing, that is, turning the driver to some extent and then stop turning. In such a case, failing to confirm a fastening degree of the bolt increases a possibility that various problems occur due to insufficient electrical connection. Additionally, when working in a dark place or a limited area, a worker may have a difficulty in confirming a final fastening degree of a bolt.

In particular, since a recent photovoltaic power generation system, which is represented by a term, mega solar, includes numerous terminal blocks, for example, the above-described work using a bolt for electrical connection may be a considerable work-load for workers.

PRIOR ART DOCUMENT

Patent Document

Patent Document 1: Japanese Patent Laid-open Publication No. 2014-22066

SUMMARY OF THE INVENTION

Problems to be Solved by the Invention

As described above, because of a possible fastening failure caused by various circumstances, it is demanded to eliminate the fastening failure or drastically reduce a frequency of occurrence of fastening failures. However, it is not easy to meet such a demand. For example, in such a terminal block as shown in FIG. 24, since a worker usually cannot know the fastening degree of the bolt only by looking at the head of the bolt, such work is required as to turn the bolt using a driver only for confirming the fastening degree.

The washer previously proposed by the applicant of the present application is effective means for highly precisely preventing insufficient tightening in the fastening of a screw of a terminal block (Patent Document 1). However, it is demanded to highly precisely prevent or reduce occurrence of problems caused by insufficient tightening in a terminal block originally requiring no washer or even in a case where the above proposed washer is not used.

Solutions to the Problems

The present invention aims to solve at least a part of the above problems. For example, one aspect of the present invention greatly contributes to, in an electrical connection device which realizes electrical connection using a male portion represented by a bolt, highly reliable prevention of insufficient tightening at a time of fastening of the male portion even without using the above proposed washer. Another aspect of the present invention greatly contributes to realization of an electrical connection device enabling a worker to visually and/or tactually determine a fastening condition of a male portion with extreme ease.

The inventors of the present invention devoted to themselves to realize an electrical connection device enabling a worker to visually and/or tactually recognize a tightening condition of a male portion with ease, a terminal block including the electrical connection device, a photovoltaic power generation system, and an electrical appliance, by elaborating a structure or a shape of the male portion represented by a bolt or a terminal block even when the above washer is not used. As described above, conducting fastening work of numerous male portions and one or a plurality of times of subsequent confirmation work for each male portion may increase a possibility of an error in work. Accordingly, the present inventors considered that making use of senses of a person (vision and tactual sense) as much as possible contributes to highly reliable reduction of work errors and/or to facilitation of confirmation of a working condition. Through numerous trials and errors, the present inventors have found that at least a part of the above problems can be solved by elaborating, as well as a structure of a male portion itself to be tightened, an internal and/or external part of a housing portion, represented by a terminal block in which the male portion is housed. The present invention has been made from the above point of view.

One electrical connection device of the present invention includes a male portion including a head having a groove for insertion of a driver, and a body portion having not less than two spiral first guide grooves formed from a lower end and a second guide groove which will be described later; a female portion having a hole portion into which the body portion is inserted; an elastic portion to be disposed on an outer circumference of the body portion when the body portion is inserted into the hole portion; and a movable body disposed below the elastic portion, the movable body having a through hole into which the body portion is inserted, and protrusions in a number corresponding to a number of the first guide grooves. In addition, in the electrical connection device of the present invention, a first conductive member and a second conductive member to be electrically connected to the first conductive member are interposed between an upper end of the elastic portion and the head, the protrusions are engaged in the first guide grooves by insertion of the body portion into the hole portion, and with the protrusions engaged in the first guide grooves, as the head rotates to a predetermined rotation angle relative to the hole portion, a biasing force of the elastic portion is increased due to a rise of the movable body in contact with a lower end of the elastic portion, and when a rotation angle of the head relative to the hole portion exceeds the predetermined rotation angle, the protrusions engage in an end portion of the second guide groove leading to the first guide grooves, the second guide groove being provided in a direction in which the biasing force is reduced, to suppress rotational movement of the protrusions relative to the body portion.

According to the electrical connection device, when the groove of the head of the male portion is rotated, since the protrusions of the movable body are engaged in the spiral first guide grooves formed from the lower end, the movable body rises to a predetermined angle along with the rotation of the male portion. As a result, in the rotation to the predetermined angle, a biasing force of the elastic portion disposed on the outer circumference of the body portion of the male portion is increased. Accordingly, in the rotation to the predetermined angle, as a rotation angle becomes larger, the load felt by a worker when rotating the male portion becomes larger.

However, when the male portion rotates more than the above predetermined angle, the protrusions engage in the second guide groove leading to the first guide grooves. Here, the second guide groove is provided in a direction in which the biasing force of the elastic portion is reduced. Accordingly, when rotating the male portion more than the predetermined angle, the worker will feel easier to rotate the male portion due to a downward biasing force of the elastic portion to the movable body. When the protrusions of the movable body tends to move along the second guide groove in a direction opposite to the rotation direction due to presence of such a male portion, a movable body, and an elastic portion, there occurs a situation where the downward biasing force of the elastic portion is increased, so that unless an external force is applied, the protrusions of the movable body which engage in the second guide groove is difficult to move in such an opposite direction. As a result, highly reliable fixing of the male portion can be realized, so that fixing of the first conductive member and the second conductive member, for example, a crimp terminal or a conductive plate, can be highly reliably realized. In addition, since a worker can tactually feel a change in a biasing force of an elastic body when the protrusions move from the first guide grooves to the second guide groove, the worker can determine a fastening condition of the male portion with extreme ease.

Another electrical connection device of the present invention includes a male portion including a head having a groove for insertion of a driver, and a body portion having a spirally penetrating first guide hole formed from a lower end and a second guide hole which will be described later; a female portion having a hole portion into which the body portion is inserted; an elastic portion to be disposed on an outer circumference of the body portion when the body portion is inserted into the hole portion; and a movable body which is disposed below the elastic portion, and engages in and penetrates through the first guide hole when the body portion is inserted into the hole portion. In addition, in another electrical connection device of the present invention, a first conductive member and a second conductive member to be electrically connected to the first conductive member are interposed between an upper end of the elastic portion and the head, and with the movable body engaged in the first guide hole, as the head rotates to a predetermined rotation angle relative to the hole portion, a biasing force of the elastic portion is increased due to a rise of the movable body in contact with a lower end of the elastic portion, and when a rotation angle of the head relative to the hole portion exceeds the predetermined rotation angle, the movable body engages in an end portion of the second guide hole leading to the first guide hole, the second guide hole being provided in a direction in which the biasing force is reduced, to suppress rotational movement of the movable body relative to the body portion.

According to the another electrical connection device, when the groove of the head of the male portion is rotated, since the movable body engages in and penetrates through the spiral first guide hole formed from the lower end, the movable body rises to a predetermined angle along with the rotation of the male portion. As a result, in the rotation to the predetermined angle, a biasing force of the elastic portion disposed on the outer circumference of the body portion of the male portion is increased. Accordingly, in the rotation to the predetermined angle, as a rotation angle becomes larger, the load felt by a worker when rotating the male portion becomes larger. In addition, since a worker can tactually feel a change in a biasing force of an elastic body when the movable body moves from the first guide hole to the second guide hole, the worker can determine a fastening condition of the male portion with extreme ease.

However, when the male portion rotates more than the above predetermined angle, the movable body engages in the second guide hole leading to the first guide hole. Here, the second guide hole is provided in a direction in which the biasing force of the elastic portion is reduced. Accordingly, when rotating the male portion more than the predetermined angle, the worker will feel easier to rotate the male portion due to a downward biasing force of the elastic portion to the movable body. When the movable body moves along the second guide hole in a direction opposite to the rotation direction due to presence of such a male portion, a movable body, and an elastic portion, there occurs a situation where the downward biasing force of the elastic portion is increased, so that unless an external force is applied, the movable body which engages in the second guide hole is difficult to move in such an opposite direction. As a result, highly reliable fixing of the male portion can be realized, so that fixing of the first conductive member and the second conductive member, for example, a crimp terminal or a conductive plate, can be highly reliably realized.

Effects of the Invention

According to the electrical connection device of the present invention, it is possible to highly reliably prevent insufficient tightening of a male portion at the time of fastening while enabling a worker to at least tactually determine a fastening condition of the male portion with extreme ease.

BRIEF DESCRIPTION OF THE DRAWINGS

FIG. 1 is a view schematically showing a configuration of a photovoltaic power generation system having a terminal block including an electrical connection device according to a first embodiment.

FIG. 2 is a perspective view schematically showing a part of the terminal block including the electrical connection device according to the first embodiment.

FIG. 3 is a perspective view showing an internal structure of a part of the terminal block including the electrical connection device according to the first embodiment.

FIG. 4A shows a front view, a left side view, and a vertical sectional view seen from the front of a shape of a bolt according to the first embodiment.

FIG. 4B is a perspective view showing a shape of the bolt according to the first embodiment.

FIG. 5 is a partial sectional side view for explaining a step of fastening a bolt in the electrical connection device according to the first embodiment.

FIG. 6 is a partial sectional side view for explaining the step of fastening a bolt in the electrical connection device according to the first embodiment.

FIG. 7 is a partial sectional side view for explaining the step of fastening a bolt in the electrical connection device according to the first embodiment.

FIG. 8 is a perspective view showing an extracted part of the step of fastening a bolt in the electrical connection device according to the first embodiment, which corresponds to FIG. 5.

FIG. 9 is a perspective view showing an extracted part of the step of fastening a bolt in the electrical connection device according to the first embodiment, which corresponds to FIG. 6.

FIG. 10 is a perspective view showing an extracted part of the step of fastening a bolt in the electrical connection device according to the first embodiment, which corresponds to FIG. 7.

FIG. 11 is a transverse sectional view taken along plane X-X in FIG. 10.

FIG. 12A shows a front view, a left side view, and a vertical sectional view seen from the front of a shape of a bolt according to a second embodiment.

FIG. 12B is a perspective view showing a shape of the bolt according to the second embodiment.

FIG. 13 is a sectional side view for explaining a step of fastening a bolt in the electrical connection device according to the second embodiment.

FIG. 14 is a sectional side view for explaining the step of fastening a bolt in the electrical connection device according to the second embodiment.

FIG. 15 is a sectional side view for explaining the step of fastening a bolt in the electrical connection device according to the second embodiment.

FIG. 16 is a perspective view showing an extracted part of the step of fastening a bolt in the electrical connection device according to the second embodiment, which corresponds to FIG. 5.

FIG. 17 is a perspective view showing an extracted part of the step of fastening a bolt in the electrical connection device according to the second embodiment, which corresponds to FIG. 6.

FIG. 18 is a perspective view showing an extracted part of the step of fastening a bolt in the electrical connection device according to the first embodiment, which corresponds to FIG. 7.

FIG. 19 is a transverse sectional view taken along plane Y-Y in FIG. 18.

FIG. 20 is a perspective view showing a shape of a bolt according to a third embodiment.

FIG. 21 is a sectional side view for explaining a step of fastening a bolt in the electrical connection device according to a fourth embodiment.

FIG. 22 is a perspective view showing a shape of a bolt according to a fifth embodiment.

FIG. 23 is a perspective view showing an extracted part of a step of fastening a bolt in the electrical connection device according to the fifth embodiment.

FIG. 24 is a perspective view showing a terminal block as a conventional example.

DESCRIPTION OF REFERENCE SIGNS 100, 200: Electrical connection device
110, 210, 410: Terminal block
112: Lid body
112a: Top face
113: Shaft portion
114: Projection
115: Upper end surface
116, 216: Female portion
117: Linear groove
118, 218: Hole portion
118a: Space
150: Solar cell module
160: Connection box
165: Power conditioner
180: Distribution panel
185: Various electrical appliances
20, 320, 520: Bolt
21, 221, 321: Head
22, 222, 322: Driver groove
24, 224: Body portion
26: Through hole
26a: First guide hole
26b: Second guide hole
210, 410: Terminal block
225: Core portion
226, 526: Groove portion
226a: First guide groove
226b: Second guide groove
27, 227: Lower end
28, 228: Connection point
29, 229: End portion
30: Column-shaped movable body
230: Movable body
232: Protrusion
234: Flat surface
35: Plate-shaped movable body
50: Conductive plate
60: Crimp terminal
800: Photovoltaic power generation system
90, 92: Wall
94: Conductive plate
98: Crimp terminal
900: Terminal block
921: Bolt
922: Groove

EMBODIMENTS OF THE INVENTION

Embodiments of the present invention will be described with reference to the accompanying drawings in detail. In the following description, common parts are given common reference signs in all the drawings unless otherwise noted. Scales of the respective elements of the embodiments shown are not always maintained in the drawings. Additionally, a part of the signs is possibly omitted for making the drawings easy to see.

First Embodiment

FIG. 1 is a schematic view showing a configuration of a photovoltaic power generation system 800 having a terminal block 110 including an electrical connection device 100 according to the present embodiment. As shown in FIG. 1, the photovoltaic power generation system 800 includes, for example, a plurality of solar cell modules 150 installed on a roof of a house, a connection box 160, and a power conditioner 165 which converts DC power generated by the solar cell module 150 to AC power. Power generated by the photovoltaic power generation system 800 is supplied to various electrical appliances 185 via a distribution panel 180. In the present embodiment, the solar cell modules 150 each including a plurality of solar battery cells are all disposed on the same plane. Additionally, the plurality of the solar cell modules 150 are electrically connected in series or in parallel to each other via the electrical connection device 100.

FIG. 2 is a perspective view schematically showing a part of the terminal block 110 including the electrical connection device 100 according to the present embodiment provided in the solar cell module 150. FIG. 3 is a perspective view showing an internal structure of a part of the terminal block 110, with a bolt 20 and a conductive plate 50 in FIG. 2 removed. FIG. 4A shows a front view, a left side view, and a vertical sectional view seen from the front of a shape of the bolt 20 as one example of a male portion according to the present embodiment (more specifically, a vertical sectional view of the center of a body portion 24 in a depth direction of the plane of drawing in FIG. 4A). FIG. 4B is a perspective view showing a shape of the bolt 20 according to the present embodiment. FIG. 5 to FIG. 7 are partial sectional side views each for explaining a step of fastening the bolt 20 in the electrical connection device 100 according to the present embodiment, respectively. Further, FIG. 8 to FIG. 10 are perspective views each showing an extracted part of the step of fastening the bolt 20 in the electrical connection device 100 according to the present embodiment, which correspond to FIG. 5 to FIG. 7, respectively. In addition, FIG. 11 is a transverse sectional view taken along plane X-X in FIG. 10. FIG. 5 to FIG. 7 are partial sectional side views seen from a direction indicated by an arrow A in FIG. 2. In FIG. 2, a crimp terminal 60 shown in the partial sectional views in FIG. 5 to FIG. 7 is not illustrated for making the figure easy to see.

First, as shown in FIG. 2 and FIG. 3, the terminal block 110 of the present embodiment includes a lid body 112 having a linear projection 114 and pivotally supported by a shaft portion 113 so as to be freely opened and closed, and a female portion 116 having a hole portion 118 into which the body portion 24 of the bolt 20 is inserted and serves as a block on which the conductive plate 50 or the crimp terminal 60 sandwiched between the female portion 116 and the bolt 20 is placed. In the present embodiment, the conductive plate 50 corresponds to a first conductive member and the crimp terminal 60 corresponds to a second conductive member. Additionally, a lead line (not shown) and the conductive plate 50 are electrically connected with the crimp terminal 60 provided therebetween to provide electrical conduction in the terminal block 110. The first conductive member and the second conductive member are not limited to the conductive plate 50 and the crimp terminal 60, respectively. Various known conductive members to which the electrical connection device 100 is applicable can be adopted in place of the specific examples described above.

As shown in FIG. 4 to FIG. 11, the bolt 20 as a male portion of the present embodiment includes a head 21 having a linear driver groove 22 into which a driver is inserted to turn the bolt 20, and the body portion 24 having a through hole 26.

Here, the through hole 26 provided in the body portion 24 of the present embodiment is formed of two regions. As shown in FIG. 4, one of the regions is a spirally penetrating first guide hole 26a formed from a lower end 27 of the body portion 24 toward the head 21 and formed to a connection point 28 which can be referred to as an inflection point. The other region is a second guide hole 26b leading to the first guide hole 26a and formed to penetrate through from the connection point 28 to an end portion 29 so as to slant toward the lower end side of the body portion 24.

As shown in FIG. 3, and FIG. 5 to FIG. 7, the hole portion 118 provided in the female portion 116 has a space for housing a coil spring 40 which is an elastic portion to be disposed on an outer circumference of the body portion 24 of the bolt 20 when the body portion 24 is inserted, and a linear groove 117 in which both ends of a movable body 30 is engaged, the movable body 30 to be engaged so as to penetrate through the above through hole 26 and having a shape with a circular section (including those having a circular shape as a continuation), which is typically a column-shape or a cylindrical shape. Accordingly, in the present embodiment, the conductive plate 50 and the crimp terminal 60 to be electrically connected to the conductive plate 50 are interposed between an upper end of the coil spring 40 and the head 21 of the bolt 20. Although in the present embodiment, the coil spring is adopted as an elastic portion, various kinds of known elastic members or plate springs can be adopted in place of a coil spring to obtain at least a part of the effects of the present embodiment.

A material of the bolt 20 in the present embodiment is not particularly limited. While the material can be appropriately selected from various points of view such as formability, processability, heat dissipation property, productivity, cost efficiency and the like, typical materials of the bolt 20 include steel, copper alloy, aluminum alloy, titanium, magnesium alloy, and resin. Additionally, a material of the movable body 30 of the present embodiment is not particularly limited. While the material can be appropriately selected from various points of view such as formability, processability, heat dissipation property, productivity, cost efficiency, and the like, typical materials of the movable body 30 include steel, copper alloy, aluminum alloy, titanium, magnesium alloy, and resin. Additionally, to the terminal block 110 of the present embodiment, known materials can be applied (e.g., plastic materials such as polybutyleneterephthalate (PBT), polyamide (PA), polycarbonate (PC), modified polyphenyleneoxide (PPO), polyphenol (PF), epoxy polyester (EP), and melamine resin (MF)).

Next, description will be made of steps from insertion of the bolt 20 into the hole portion 118 of the female portion 116 until fastening of the bolt 20 in the present embodiment.

First, the bolt 20 is inserted into the hole 118 of the female portion 116 of the terminal block 110 so as to have the conductive plate 50 and the crimp terminal 60 provided therebetween. This makes the movable body 30 fit in the through hole 26 formed from the lower end 27 of the body portion 24 of the bolt 20, resulting in a state where the movable body 30 passes through the lower end 27 of the body portion 24 and/or in the vicinity of the lower end 27 as shown in FIG. 5 and FIG. 8. In the present embodiment, a plate-shaped movable body 35 made of SUS and having a donut-shape is interposed between the movable body 30 and the coil spring 40. The plate-shaped movable body 35 enables a change in a biasing force of a spring to be generated more smoothly according to subsequent movement of the movable body 30. In FIG. 8 to FIG. 10, the plate-shaped movable body 35 is illustrated with broken lines for making movement of the movable body 30 easier to understand. In the present embodiment, it is configured such that at a stage where the movable body 30 is fit in the through hole 26 which is formed from the lower end 27 of the body portion 24 of the bolt 20, and the bolt 20 is not turned, no biasing force of the coil spring 40 is substantially generated.

When the bolt 20 is turned with the head 21 pressed by a driver in the state shown in FIG. 5 and FIG. 8, the movable body 30 rises while spirally moving along the first guide hole 26a. Then, as shown in FIG. 6 and FIG. 9, the biasing force of the coil spring 40 disposed on the outer circumference of the body portion 24 is increased before reaching the connection point 28. Accordingly, when the movable body 30 rises while spirally moving along the first guide hole 26a, a worker is burdened with turning the bolt 20.

It can be seen that when the movable body 30 reaches the connection point 28, the movable body 30 comes to the most raised position in the movement within the through hole 26, so that within the hole portion 118 provided in the female portion 116, a space 118a below the movable body 30 is wider than the space shown in the other two figures (FIG. 5 and FIG. 7). As a result, at a stage where the movable body 30 reaches the connection point 28, a compression force to the coil spring 40 is maximum and the biasing force of the coil spring 40 is maximum accordingly. For convenience of explanation, white-blanking arrows in FIG. 6 and FIG. 7 conceptually represent a direction and an amount of the compression force to the coil spring 40 along with a rise of the movable body 30 (substantially, the plate-shaped movable body 35). Additionally, arrows with slanting lines in FIG. 6 and FIG. 7 conceptually represent a direction and an amount of the biasing force of the coil spring 40 (the force applied to the movable body 30).

When the bolt 20 is further turned by the driver, the movable body 30 moves along the second guide hole 26b slanting toward the lower end side of the body portion 24 over the connection point 28 to finally reach the end portion 29 of the second guide hole 26b. As a result, as shown in FIG. 7 and FIG. 10, the biasing force of the coil spring 40 disposed on the outer circumference of the body portion 24 is slightly reduced. Accordingly, when turning the bolt 20 over the connection point 28, the worker feels easy to turn the bolt 20 due to the downward biasing force of the coil spring 40 to the movable body 30. As a result, since the worker can not only visually but also tactually feel a change in the biasing force of the coil spring 40 at a time of shift of the movable body 30 from the first guide hole 26a to the second guide hole 26b, the worker can determine a fastening condition of the bolt 20 with extreme ease.

Further, it should be noted that in the present embodiment, since the end portion 29 of the second guide hole 26b does not reach the lower end of the body portion 24, the biasing force of the coil spring 40, in other words, the downward force to be applied to the movable body 30 remains. Therefore, the movable body 30, i.e. the bolt 20 itself is always pressed downward by the remaining biasing force of the coil spring 40, which realizes a condition where the movable body 30 hardly moves backward toward the connection point 28 along the second guide hole 26b. Specifically, a condition is realized in which, unless an external force is applied, the movable body 30 hardly moves upward to increase the biasing force of the coil spring 40. As a result, insufficient tightening of the bolt 20 at the time of fastening can be highly reliably prevented while realizing highly reliable fixing of the bolt 20. In other words, rotational movement of the movable body 30 relative to the body portion 24 is suppressed. Although it is one of modifications of the present embodiment to configure such that the end portion 29 of the second guide hole 26b is formed to reach the lower end of the body portion 24, from a point of view of realizing more reliable fixing of the bolt 20, it is preferable to achieve a condition where the bolt 20 itself is always pressed downward as in the present embodiment.

As described above, the bolt 20 includes the head 21 having the linear driver groove 22. In the present embodiment, as shown in FIG. 2, the second guide hole 26b is formed such that the linear groove which is the driver groove 22 is substantially parallel to a side wall of the terminal block 110 when the bolt 20 is turned until the movable body 30 reaches the end portion 29 of the second guide hole 26b. Accordingly, it is possible to achieve a condition where the worker can, in particular visually, recognize a tightening condition of the bolt 20 with ease.

More interestingly, the terminal block 110 of the present embodiment is further elaborated to enable a worker to visually and/or tactually recognize a tightening condition of the bolt 20 with ease. Specifically, the terminal block 110 includes the lid body 112 having the projection 114. The projection 114 is configured, as shown in FIG. 2, such that when the bolt 20 is turned to a predetermined angle by using, for example, a driver, the projection 114 can be engaged in the groove 22 of the bolt 20. In the present embodiment, a predetermined angle (or a predetermined rotation angle) is an angle to which the bolt 20 is turned until the movable body 30 reaches the end portion 29 of the second guide hole 26b. Accordingly, by tactually feeling that the projection 114 is engaged in the groove 22 of the bolt 20, the worker can recognize a tightening condition of the bolt 20 with ease.

Here, it is preferable that the lid body 112 is rotated to an extent that the worker can visually and/or tactually feel that the projection 114 is satisfactorily engaged in the groove 22 of the bolt 20. In a preferable example, it is configured such that, as a result of satisfactory engagement of the projection 114 in the groove 22 of the bolt 20, which is caused by, so to speak, closing of the lid body 112, a top face 112a of the lid body 112 is not located above an upper end surface 115 of the side wall of the terminal block 110.

Although the through hole 26 of the present embodiment is formed of two regions (26a, 26b), the through hole 26 is not limited to this mode. For example, another mode can be adopted in which, between the first guide hole 26a and the second guide hole 26b, a region of a flat hole with a certain length, in other words, a region in which a biasing force of the coil spring 40 on the outer circumference does not substantially change, is formed in order to ensure a sufficient rotation angle before the male portion (e.g., bolt) is finally fastened. In the present application, a second guide hole 26b leading to the first guide hole 26a via such a region in which the biasing force of the coil spring 40 on the outer circumference does not substantially change is also assumed to be included in the second guide hole 26b which "leads to the first guide hole 26a".

Although in the present embodiment, the plate-shaped movable body 35 having a donut-shape is interposed between the movable body 30 and the coil spring 40, the present embodiment is not limited to this mode. For example, even without the plate-shaped movable body 35, the movable body 30 itself can cause a change in the biasing force of the spring. From a point of view of causing a change in the biasing force of the spring more smoothly, it is preferred that the electrical connection device 100 of the present embodiment includes the plate-shaped movable body 35.

Second Embodiment

In the present embodiment, an electrical connection device and a terminal block are the same as the electrical connection device 100 and the terminal block 110 of the first embodiment, except that the bolt 20, the lid body 112 provided in the terminal block 110, and a mechanism which causes a change in a biasing force of the coil spring 40 of the first embodiment are changed. Accordingly, description overlapping with that of the first embodiment will be omitted.

FIG. 12A shows a front view, a left side view, and a vertical sectional view seen from the front (more specifically, a vertical sectional view of the center of a body portion 224 in a depth direction of the plane of drawing in FIG. 12A) of a shape of a bolt 220 as one example of a male portion according to the present embodiment. FIG. 12B is a perspective view showing the shape of the bolt 220 according to the present embodiment. FIG. 13 to FIG. 15 are partial sectional side views for explaining a step of fastening the bolt 220 in an electrical connection device 200 according to the present embodiment, respectively. FIG. 16 to FIG. 18 are perspective views showing extracted parts of the step of fastening the bolt 220 in the electrical connection device 200 of the present embodiment, which correspond to FIG. 13 to FIG. 15, respectively. In addition, FIG. 19 is a sectional view taken along plane Y-Y in FIG. 18. FIG. 13 to FIG. 19 are views corresponding to FIG. 4 to FIG. 11 of the first embodiment, respectively.

First, as shown in FIG. 12 to FIG. 15, a terminal block 210 of the present embodiment has a hole portion 218 into which the body portion 224 of the bolt 220 is inserted, and a female portion 216 serving as a block on which the conductive plate 50 or the crimp terminal 60 engagedly held between the female portion and the bolt 220 is placed. The terminal block 210 of the present embodiment does not include the lid body 112 of the first embodiment. Additionally, the hole portion 218 of the present embodiment does not have the linear groove 117 provided in the hole portion 118 of the first embodiment. This is because, as will be described later, in the present embodiment, a movable body 230 having a protrusion 232 is adopted in place of the movable body 30 of the first embodiment.

As shown in FIG. 12 to FIG. 18, the bolt 220 as a male portion of the present embodiment includes a head 221 having a linear driver groove 222 in which a driver is inserted to turn the bolt 220, and two non-through groove portions 226, 226. The groove portions 226, 226 of the present embodiment are disposed to have point symmetry in the body portion 224 when seen from the head 221 of the bolt 220. Additionally, a core portion 225 of the body portion 224 also serves as a bottom portion of the groove portions 226, 226.

Here, the groove portion 226 provided in the body portion 224 of the present embodiment is formed of two regions. As shown in FIG. 12, one of the regions is a first guide groove 226a spirally formed from a lower end 227 of the body portion 24 to a connection point 228, which can be referred to as an inflection point, toward the head 221. The other region is a second guide groove 226b leading to the first guide groove 226a and formed from the connection point 228 to an end portion 229 so as to slant toward the lower end side of the body portion 224.

As shown in FIG. 13 to FIG. 19, the hole portion 218 provided in the female portion 216 has a space for housing the coil spring 40 which is an elastic portion to be disposed on an outer circumference of the body portion 224 of the bolt 220 when the body portion 224 is inserted, and a space for housing the movable body 230 which includes the protrusion 232 to be engaged in the above groove portion 226. Accordingly, in the present embodiment, the conductive plate 50 and the crimp terminal 60 to be electrically connected to the conductive plate 50 are interposed between the upper end of the coil spring 40 and the head 221 of the bolt 220.

As a material of the bolt 220 of the present embodiment, the same material as that of the bolt 20 of the first embodiment is applicable. Additionally, a material of the movable body 230 of the present embodiment is not particularly limited. While the material can be appropriately selected from various points of view such as formability, processability, heat dissipation property, productivity, cost efficiency, and the like, typical materials of the movable body 230 include steel, copper alloy, aluminum alloy, titanium, magnesium alloy, and resin. Additionally, the same materials as those of the terminal block 210 of the present embodiment and the terminal block 110 of the first embodiment are applicable.

Next, description will be made of steps from insertion of the bolt 220 into the hole portion 218 of the female portion 216 until fastening of the bolt 20 in the present embodiment.

First, the bolt 220 is inserted into the hole 218 of the female portion 216 of the terminal block 210 so as to have the conductive plate 50 and the crimp terminal 60 provided therebetween. This makes the protrusion 232 of the movable body 230 fit in the groove portion 226 formed from the lower end 227 of the body portion 224 of the bolt 220, results in a state in which the protrusion 232 is fit in the lower end 227 of the body portion 224/or in the vicinity of the lower end 227 as shown in FIG. 13 and FIG. 15.

Here, as shown in FIG. 16 to FIG. 19, the movable body 230 of the present embodiment is a donut-shaped plate in which the protrusion 232 is formed and which has, as a side surface of an outer circumference thereof, not only a curved surface but also a flat surface 234. The flat surface 234 prevents rotation of the movable body 230 along with turning of the bolt 220. Additionally, the movable body 230 of the present embodiment enables a change in a biasing force of a spring to be generated more smoothly according to subsequent movement of the movable body 230. Accordingly, it should be noted that the movable body 230 of the present embodiment has both functions of the movable body 30 and the plate-shaped movable body 35 in the first embodiment. In FIG. 16 to FIG. 18, a part of the protrusion 232 and a part of the movable body 230 are illustrated with broken lines for making movement of the movable body 230 easier to understand. In the present embodiment, it is configured such that at a stage where the protrusion 232 is fit in the groove portion 226 which is formed from the lower end 227 of the body portion 224 of the bolt 220, and the bolt 220 is not turned, no biasing force of the coil spring 40 is substantially generated.

When the bolt 220 is turned with the head 221 pressed by a driver in the state shown in FIG. 13 and FIG. 16, the movable body 230 rises while spirally moving along the first guide groove 226a. Then, as shown in FIG. 14 and FIG. 17, the biasing force of the coil spring 40 disposed on the outer circumference of the body portion 224 is increased before reaching the connection point 228. Accordingly, when the movable body 230 rises while spirally moving along the first guide groove 226a, a worker is burdened with turning the bolt 20.

When the movable body 230 reaches the connection point 228, the protrusion 232 (and the movable body 230) comes to the most raised position in the movement within the groove portion 226. As a result, at a stage where the protrusion 232 reaches the connection point 228, a compression force to the coil spring 40 is maximum and the biasing force of the coil spring 40 is maximum accordingly.

When the bolt 220 is further turned by the driver, the protrusion 232 (and the movable body 230) moves along the second guide groove 226b slanting toward the lower end side of the body portion 224 over the connection point 228 to finally reach the end portion 229 of the second guide groove 226b. As a result, as shown in FIG. 15 and FIG. 18, the biasing force of the coil spring 40 disposed on the outer circumference of the body portion 224 is slightly reduced. Accordingly, when turning the bolt 220 over the connection point 228, the worker feels easy to turn the bolt 220 due to the downward biasing force of the coil spring 40 to the movable body 230. As a result, since the worker can tactually feel a change in the biasing force of the coil spring 40 at a time of shift of the movable body 230 from the first guide groove 226a to the second guide groove 226b, the worker can determine a fastening condition of the bolt 220 with extreme ease.

Additionally, similarly to the first embodiment, in the present embodiment, since the end portion 229 of the second guide groove 226b does not reach the lower end of the body portion 224, the biasing force of the coil spring 40, in other words, the downward force to be applied to the movable body 230 remains. Therefore, the movable body 230, i.e. the bolt 220 itself is always pressed downward by the remaining biasing force of the coil spring 40, which realizes a condition where the movable body 230 (more precisely, the protrusion 232 of the movable body 230) hardly moves backward toward the connection point 228 along the second guide groove 226b. Specifically, a condition is realized in which, unless an external force is applied, the movable body 230 hardly moves upward to increase the biasing force of the coil spring 40. As a result, insufficient tightening of the bolt 220 at the time of fastening can be highly reliably prevented while realizing highly reliable fixing of the bolt 220. In other words, rotational movement of the protrusion 232 relative to the body portion 224 is suppressed. Although it is one of modifications of the present embodiment to configure such that the end portion 229 of the second guide groove 226b is formed to reach the lower end of the body portion 224, from a point of view of realizing more reliable fixing of the bolt 220, it is preferable to achieve a condition where the bolt 220 itself is always pressed downward as in the present embodiment.

Although in the present embodiment, the second guide grooves 226 are disposed to have point symmetry in the body portion 224 when seen from the head 221 of the bolt 220, the arrangement is not limited thereto. For smooth turning of the bolt 220, the second guide groove 226 is preferably disposed at a point symmetric position as in the present embodiment.

Although the groove portion 226 of the present embodiment is formed of two regions (26a, 26b), the groove portion 226 is not limited to this mode. For example, another mode can be adopted in which, between the first guide groove 226a and the second guide groove 226b, a region of a flat hole with a certain length, in other words, a region in which a biasing force of the coil spring 40 on the outer circumference does not substantially change, is formed in order to ensure a sufficient rotation angle before the male portion (e.g., bolt) is finally fastened. In the present application, a second guide groove 226b leading to the first guide groove 226a via such a region in which the biasing force of the coil spring 40 on the outer circumference does not substantially change is also assumed to be included in the second guide groove 226b which "leads to the first guide groove 226a".

Third Embodiment

The present embodiment has a mode in which in the first embodiment, a bolt 320 is adopted in place of the bolt 20. FIG. 20 is a perspective view showing a shape of the bolt 320 of the present embodiment, which corresponds to FIG. 4.

As shown in FIG. 20, the bolt 320 of the present embodiment includes a head 321 having a cross-shaped driver groove 322 in which a driver is inserted to turn the bolt 320, and a body portion 24 having the same configuration as that of the body portion 24 of the bolt 20 in the first embodiment. Even with the bolt 320 of such a mode, at least a part of the effects of the first embodiment can be obtained.

However, for enabling a worker to visually recognize a tightening condition of the bolt with ease, it is more preferable to adopt a linear driver groove than the cross-shaped driver groove 322. Needless to say, in the second embodiment or a fourth embodiment to be described later, a bolt including a head having the cross-shaped driver groove 322 can be adopted as one modification.

Fourth Embodiment

A terminal block 410 of the present embodiment has the same configuration as that of the electrical connection device 100 and the terminal block 210 of the second embodiment, except that the terminal block 410 is provided with the lid body 112 of the first embodiment, which is not provided in the terminal block 210 of the second embodiment.

FIG. 21 is a sectional side view for explaining a step of fastening the bolt 220 in an electrical connection device according to the present embodiment. More specifically, FIG. 21 is a sectional side view corresponding to FIG. 15 regarding the terminal block 410 of the present embodiment. In the present embodiment, the bolt 220 includes the head 221 having the linear driver groove 222. Also in the present embodiment, similarly to the terminal block 110 of the first embodiment shown in FIG. 2, the second guide groove 226b is formed such that the linear groove which is the driver groove 222 is substantially parallel to a side wall of the terminal block 210 when the bolt 220 is turned until the movable body 230 (more precisely, the protrusion 232 of the movable body 230) reaches the end portion 229 of the second guide groove 226b. Accordingly, it is possible to achieve a condition where the worker can, in particular visually, recognize a tightening condition of the bolt 220 with ease.

Further, the terminal block 410 of the present embodiment includes the lid body 112 having the projection 114. The projection 114 is configured such that when the bolt 220 is turned to a predetermined angle by using, for example, a driver, the projection 114 can be engaged in the groove 222 of the bolt 220. In the present embodiment, a predetermined angle (or a predetermined rotation angle) is an angle to which the bolt 20 is turned until the movable body 230 reaches the end portion 29 of the second guide groove 226b. Accordingly, the worker can recognize a tightening condition of the bolt 20 with ease not only by visually but also by tactually feeling that the projection 114 is engaged in the groove 222 of the bolt 220.

Here, it is preferable that the lid body 112 is rotated to an extent that the worker can visually and/or tactually feel that the projection 114 is satisfactorily engaged in the groove 222 of the bolt 20. In a preferable example, it is configured such that, as a result of satisfactory engagement of the projection 114 in the groove 222 of the bolt 220, which is caused by, so to speak, closing of the lid body 112, the top face 112a of the lid body 112 is not located above the upper end surface 115 of the side wall of the terminal block 410.

Fifth Embodiment

The second and fourth embodiments adopt the bolt 220 in which the same number of the groove portions 226 are formed as the number of the two protrusions 232 provided in the movable body 230. However, the number of the protrusions 232 and the number of the groove portions 226 are not limited to two. FIG. 22 is a perspective view showing a shape of a bolt 520 according to the present embodiment. FIG. 23 is a perspective view showing an extracted part of a step of fastening the bolt 520 in an electrical connection device according to the present embodiment.

As shown in FIG. 22 and FIG. 23, the bolt 520 of the present embodiment has three groove portions 526 each formed of a spiral first guide groove, and a second guide groove leading to the first guide groove. Here, the first guide groove and the second guide groove both have the same functions of the first guide groove 226a and the second guide groove 226b of the second embodiment. A range of an angle covered by the first guide groove and a range of an angle covered by the second guide groove of the bolt 520 are equal to or smaller than the ranges of the angles of the first guide groove 226a and the second guide groove 226b of the second embodiment, respectively.

Even when the bolt 520 of the present embodiment is adopted, at least a part of the effects of the second embodiment and the modifications thereof can be obtained. However, from a point of view of easiness of process and/or reliability of bolt fastening, it is preferable to adopt the two protrusions 232 and the bolt 220 having the two groove portions 226.

Other Embodiment (1)

In addition, in the second and fourth embodiments, the number of the protrusions may not necessarily be the same as the number of the groove portions 226 having the first guide grooves 226a. For example, in a case where three first guide grooves 226a are provided as in the fifth embodiment, even if the number of protrusions of the movable body 320 is two, at least a part of the effects of the second embodiment and modifications thereof can be obtained. Accordingly, a movable body 230 having protrusions 232 in the number corresponding to the number of the first guide grooves 226a includes not only the movable body 230 having protrusions 232 in the same number as the number of the first guide grooves 226a but also the movable body 230 having the smaller number of protrusions 232 than the first guide grooves 226a. However, from a point of view of increasing workability in bolt fastening work, it is preferable to adopt the movable body 230 having the same number of protrusions 232 as the number of the first guide grooves 226a.

Other Embodiment (2)

In the second and fourth embodiments, the non-through groove portions 226 provided in the bolt 220 are disposed to have point symmetry in the body portion 224 when seen from the head 221 of the bolt 220. However, the respective bolts of the second and fourth embodiments are not limited to such a mode. For example, even when the non-through groove portions are not disposed to have point symmetry in the body portion 224 when seen from the head 221 of the bolt 220, at least a part of the effects of the second and fourth embodiments can be obtained. However, from the point of view of increasing workability in bolt fastening work, it is preferable to dispose groove portions to have point symmetry in the body portion when seen from the head of the bolt, the groove portions in which the protrusions of the movable body are engaged.

Other Embodiment (3)

In the above embodiments, a range of an angle covered by the first guide hole 26a or the first guide groove 226a, or a range of an angle covered by the second guide hole 26b or the second guide groove 226b is not particularly limited. The above angles can be appropriately selected so as to meet a structure of the terminal block, a shape of the bolt, and/or a required fastening condition of the bolt, and the like.

Additionally, the electrical connection devices of the above-described embodiments are applicable to facilities other than a photovoltaic power generation system. The electrical connection devices and/or terminal blocks of the above-described embodiments are also applicable to various electrical appliances.

Disclosure of the above-described embodiments is for illustrative purpose only and it is not to be construed to limit the present invention. In addition, modifications within the scope of the present invention including other combinations of the embodiments are also covered by the scope of claims for patent.

The invention claimed is:

1. An electrical connection device comprising:
a male portion including a head having a groove for insertion of a driver, and a body portion having not less than two spiral first guide grooves formed from a lower end;
a female portion having a hole portion into which the body portion is inserted;
an elastic portion to be disposed on an outer circumference of the body portion when the body portion is inserted into the hole portion; and
a movable body disposed below the elastic portion, the movable body having a through hole into which the body portion is inserted, and protrusions in a number corresponding to a number of the first guide grooves,
wherein a first conductive member and a second conductive member to be electrically connected to the first conductive member are interposed between an upper end of the elastic portion and the head,
the protrusions are engaged in the first guide grooves by insertion of the body portion into the hole portion, and
with the protrusions engaged in the first guide grooves, as the head rotates to a predetermined rotation angle relative to the hole portion, a biasing force of the elastic portion is increased due to a rise of the movable body in contact with a lower end of the elastic portion, and when a rotation angle of the head relative to the hole portion exceeds the predetermined rotation angle, the protrusions engage in an end portion of a second guide groove leading to the first guide grooves, the second guide groove being provided in a direction in which the biasing force is reduced, to suppress rotational movement of the protrusions relative to the body portion.

2. The electrical connection device according to claim 1, wherein the groove of the head is a linear groove.

3. The electrical connection device according to claim 2, wherein the elastic portion is a coil spring.

4. The electrical connection device according to claim 1, wherein the elastic portion is a coil spring.

5. A terminal block comprising the electrical connection device according to claim 1, wherein a lid body is attached to be freely opened and closed, the lid body having a projection capable of being engaged in the groove of the head when the head rotates relative to the hole portion until the protrusions engage in the second guide groove.

6. A photovoltaic power generation system comprising the terminal block according to claim 5.

7. An electrical appliance comprising the terminal block according to claim 5.

8. An electrical connection device comprising:
- a male portion including a head having a groove for insertion of a driver, and a body portion having a spirally penetrating first guide hole formed from a lower end;
- a female portion having a hole portion into which the body portion is inserted;
- an elastic portion to be disposed on an outer circumference of the body portion when the body portion is inserted into the hole portion; and
- a movable body which is disposed below the elastic portion, and engages in and penetrates through the first guide hole when the body portion is inserted into the hole portion,
- wherein a first conductive member and a second conductive member to be electrically connected to the first conductive member are interposed between an upper end of the elastic portion and the head, and
- with the movable body engaged in the first guide hole, as the head rotates to a predetermined rotation angle relative to the hole portion, a biasing force of the elastic portion is increased due to a rise of the movable body in contact with a lower end of the elastic portion, and when a rotation angle of the head relative to the hole portion exceeds the predetermined rotation angle, the movable body engages in an end portion of a second guide hole leading to the first guide hole, the second guide hole being provided in a direction in which the biasing force is reduced, to suppress rotational movement of the movable body relative to the body portion.

9. The electrical connection device according to claim 8, further comprising a plate-shaped movable body between the movable body and the elastic portion, the plate-shaped movable body having a through hole into which the body portion is inserted and being brought into contact with the lower end of the elastic portion when the head rotates to the predetermined rotation angle relative to the hole portion.

10. The electrical connection device according to claim 8, wherein the groove of the head is a linear groove.

11. The electrical connection device according to claim 8, wherein the elastic portion is a coil spring.

12. A terminal block comprising the electrical connection device according to claim 8, wherein a lid body is attached to be freely opened and closed, the lid body having a projection capable of being engaged in the groove of the head when the head rotates relative to the hole portion until the movable body engages in the second guide hole.

13. A photovoltaic power generation system comprising the terminal block according to claim 12.

14. An electrical appliance comprising the terminal block according to claim 12.

* * * * *